United States Patent
Gargash et al.

(10) Patent No.: US 8,631,414 B2
(45) Date of Patent: Jan. 14, 2014

(54) DISTRIBUTED RESOURCE MANAGEMENT IN A PORTABLE COMPUTING DEVICE

(75) Inventors: Norman S. Gargash, Boulder, CO (US);
Yizheng Zhou, San Diego, CA (US);
Vinod Vijayarajan, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 13/225,152

(22) Filed: Sep. 2, 2011

(65) Prior Publication Data
US 2012/0227053 A1 Sep. 6, 2012

Related U.S. Application Data

(63) Continuation-in-part of application No. 12/882,395, filed on Sep. 15, 2010.

(51) Int. Cl.
*G06F 9/46* (2006.01)
*G06F 15/173* (2006.01)

(52) U.S. Cl.
USPC .......................... 718/104; 718/106; 709/226

(58) Field of Classification Search
None
See application file for complete search history.

(56) References Cited

U.S. PATENT DOCUMENTS

| | | |
|---|---|---|
| 6,332,167 B1 | 12/2001 | Peters et al. |
| 6,571,354 B1 | 5/2003 | Parks et al. |
| 6,574,654 B1 | 6/2003 | Simmons et al. |
| 6,715,145 B1 | 3/2004 | Bowman-Amuah |
| 6,817,018 B1 | 11/2004 | Clarke et al. |
| 6,901,446 B2 | 5/2005 | Chellis et al. |
| 7,050,807 B1 | 5/2006 | Osborn |
| 7,114,158 B1 | 9/2006 | Thompson et al. |
| 7,117,273 B1 | 10/2006 | O'toole et al. |
| 7,152,157 B2 | 12/2006 | Murphy et al. |

(Continued)

FOREIGN PATENT DOCUMENTS

| | | |
|---|---|---|
| EP | 1933237 A1 | 6/2008 |
| WO | 0184301 A2 | 11/2001 |
| WO | 2010001322 A1 | 1/2010 |
| WO | 2010120247 A1 | 10/2010 |

OTHER PUBLICATIONS

Berenson H., et al., "A critique of ANSI SQL Isolation Levels", SIGMOD Record, ACM, New York, NY, US, vol. 24, No. 2, Jun. 1, 1995, pp. 1-10, XP002234701, ISSN: 0163-5808, DOI: 10.1145/568271.223785.

(Continued)

*Primary Examiner* — Van Nguyen
(74) *Attorney, Agent, or Firm* — Nicholas A. Cole

(57) ABSTRACT

In a portable computing device having a node-based resource architecture, a first or distributed node controlled by a first processor but corresponding to a second or native node controlled by a second processor is used to indirectly access a resource of the second node. In a resource graph defining the architecture each node represents an encapsulation of functionality of one or more resources, each edge represents a client request, and adjacent nodes represent resource dependencies. Resources defined by a first graph are controlled by the first processor but not the second processor, while resources defined by a second graph are controlled by the second processor but not the first processor. A client request on the first node may be received from a client under control of the first processor. Then, a client request may be issued on the second node in response to the client request on the first node.

28 Claims, 16 Drawing Sheets

(56) References Cited

U.S. PATENT DOCUMENTS

| | | | |
|---|---|---|---|
| 7,337,446 B2 | 2/2008 | Sankaranarayan et al. | |
| 7,694,158 B2 | 4/2010 | Melpignano et al. | |
| 7,814,486 B2 | 10/2010 | Papakipos et al. | |
| 8,209,703 B2* | 6/2012 | Yee et al. | 718/106 |
| 8,510,751 B2* | 8/2013 | Saha et al. | 719/313 |
| 8,543,800 B2* | 9/2013 | Arditti et al. | 713/2 |
| 2002/0087734 A1 | 7/2002 | Marshall et al. | |
| 2003/0005167 A1 | 1/2003 | Khare et al. | |
| 2003/0163275 A1 | 8/2003 | Farrell et al. | |
| 2004/0068723 A1 | 4/2004 | Graupner et al. | |
| 2005/0033846 A1 | 2/2005 | Sankaranarayan et al. | |
| 2005/0183143 A1 | 8/2005 | Anderholm et al. | |
| 2005/0283759 A1 | 12/2005 | Peteanu et al. | |
| 2006/0101453 A1 | 5/2006 | Burkhart et al. | |
| 2006/0150188 A1 | 7/2006 | Roman et al. | |
| 2007/0136725 A1 | 6/2007 | Accapadi et al. | |
| 2007/0294364 A1 | 12/2007 | Mohindra et al. | |
| 2007/0294698 A1 | 12/2007 | Thoelke et al. | |
| 2008/0022286 A1 | 1/2008 | Chung et al. | |
| 2008/0034195 A1 | 2/2008 | Gilliam et al. | |
| 2008/0049614 A1 | 2/2008 | Briscoe et al. | |
| 2008/0085717 A1 | 4/2008 | Chhabra et al. | |
| 2008/0086470 A1 | 4/2008 | Graefe | |
| 2008/0229320 A1 | 9/2008 | Ueda | |
| 2008/0244507 A1 | 10/2008 | Hodson et al. | |
| 2008/0244599 A1 | 10/2008 | Hodson et al. | |
| 2008/0294777 A1 | 11/2008 | Karve et al. | |
| 2009/0007153 A1 | 1/2009 | Mysore et al. | |
| 2009/0043809 A1 | 2/2009 | Fakhouri et al. | |
| 2009/0049438 A1 | 2/2009 | Draper et al. | |
| 2009/0090783 A1 | 4/2009 | Killian et al. | |
| 2009/0158292 A1 | 6/2009 | Rattner et al. | |
| 2010/0138818 A1 | 6/2010 | Harrop et al. | |
| 2010/0138825 A1 | 6/2010 | Harrop | |
| 2010/0162247 A1 | 6/2010 | Welc et al. | |
| 2010/0218194 A1 | 8/2010 | Dallman et al. | |
| 2010/0333095 A1 | 12/2010 | Shavit et al. | |
| 2011/0010478 A1 | 1/2011 | Zou et al. | |
| 2011/0041136 A1 | 2/2011 | Messier et al. | |
| 2011/0088034 A1* | 4/2011 | Vernier | 718/100 |
| 2011/0138135 A1 | 6/2011 | Dice et al. | |
| 2012/0066391 A1 | 3/2012 | Gargash et al. | |
| 2012/0124566 A1 | 5/2012 | Federighi et al. | |
| 2012/0239812 A1 | 9/2012 | Gargash et al. | |
| 2013/0019249 A1 | 1/2013 | Gargash et al. | |
| 2013/0031560 A1 | 1/2013 | Gargash et al. | |

OTHER PUBLICATIONS

Gamma E., et al., "Design Patterns: elements of reusable object-oriented software passage", Design Patterns. Elements of Reusable Object-Oriented Software, XX, XX, Jan. 1, 1995, pp. 1-9, 207, XP002200550.

International Search Report and Written Opinion—PCT/US2012/050815—ISA/EPO—Dec. 18, 2012.

Plasil F., et al., "An architectural view of distributed objects and components in CORBA, Java RMI and COM/DCOM", Internet Citation, Jun. 1998, XP002326430, Retrieved from the Internet: URL:www.informatik.uni-trier.de/~ley/db/journals/stp/stp19.html [retrieved on Apr. 28, 2005].

OSGi Alliance, "OSGi Service Platform Core Specification", Release 4, Version 4.0.1, Jul. 2006, pp. 266 (2006 r4.core.pdf).

OSGi Alliance, "OSGi Service Platform Mobile Specification", Release 4, Version 4.0, Jul. 2006, pp. 502 (2006 r4.mobile.pdf).

Schmidt et al., "The Corba Component Model: Part 1, Evolving Towards Component Middleware", Feb. 1, 2004 from http://www.drdobbs.com/the-corba-component-model-part-1-evolvin/184403884.

Stanley L., et al., "C++ Primer", Fourth Edition, Feb. 14, 2005, Published. Addison Wesley Professional, ISBN: 0-201-72148-1.

* cited by examiner

_DISTRIBUTED RESOURCE MANAGEMENT IN A PORTABLE COMPUTING DEVICE_

This application is a continuation-in-part of and claims priority to U.S. Non-Provisional patent application Ser. No. 12/882,395 entitled "SYSTEM AND METHOD FOR MANAGING RESOURCES OF A PORTABLE COMPUTING DEVICE" and filed on Sep. 15, 2010, which is incorporated herein in its entirety.

DESCRIPTION OF THE RELATED ART

Portable computing devices ("PCDs") are becoming increasingly popular. These devices may include cellular telephones, portable/personal digital assistants ("PDAs"), portable game consoles, portable navigation units, palmtop computers, and other portable electronic devices. Each of these devices may have a primary function. For example, a cellular telephone generally has the primary function of receiving and transmitting telephone calls.

In addition to the primary function of these devices, many include peripheral functions. For example, a cellular telephone may include the primary function of making cellular telephone calls as described above, and the peripheral functions of a still camera, a video camera, global positioning system (GPS) navigation, web browsing, sending and receiving e-mails, sending and receiving text messages, and push-to-talk capabilities, etc. As the functionality of PCDs increases, the computing or processing power required to support such functionality also increases. Processing power may be increased by increasing the number of processors in the PCD. As the computing power and number of processors increases, there exists a greater need to effectively manage the processors.

Functions such as those described above may be embodied in various corresponding hardware and software elements that may be referred to as resources. A processor may request various resources at various times under control of software, such as an application program. In a multi-processor PCD, a first processor may control resources that are different from the resources controlled by a second processor. However, it may be desirable for the first processor to be able to request resources controlled by the second processor.

SUMMARY

A method and system for managing distributed resources in a multi-processor portable computing device allows one processor to issue a resource request against a resource controlled by another processor. In a portable computing device having a node-based software architecture, a resource may be included in a node. In an exemplary embodiment, a first node controlled by a first processor but corresponding to a second node controlled by a second processor is instantiated and subsequently used to indirectly access a resource of the second node. The first node may be referred to as a distributed node, and the second node may be referred to as a native node. A first plurality of resources is controlled by the first processor but not the second processor. A second plurality of resources is controlled by the second processor but not the first processor. The first plurality of resources may be defined by a first directed acyclic graph, and the second plurality of resources may be defined by a second directed acyclic graph. Each node or resource of the first graph represents an encapsulation of functionality of one or more resources controlled by the first processor. Each edge of the first graph represents a client request. Adjacent nodes of the first graph represent resource dependencies. Likewise, each node of the second graph represents an encapsulation of functionality of one or more resources controlled by the second processor. Each edge of the second graph represents a client request. Adjacent nodes of the second graph represent resource dependencies.

In accordance with an exemplary method, a client request on the first node may be received from a client under control of the first processor. Then, a client request may be issued on the second node in response to the client request on the first node.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
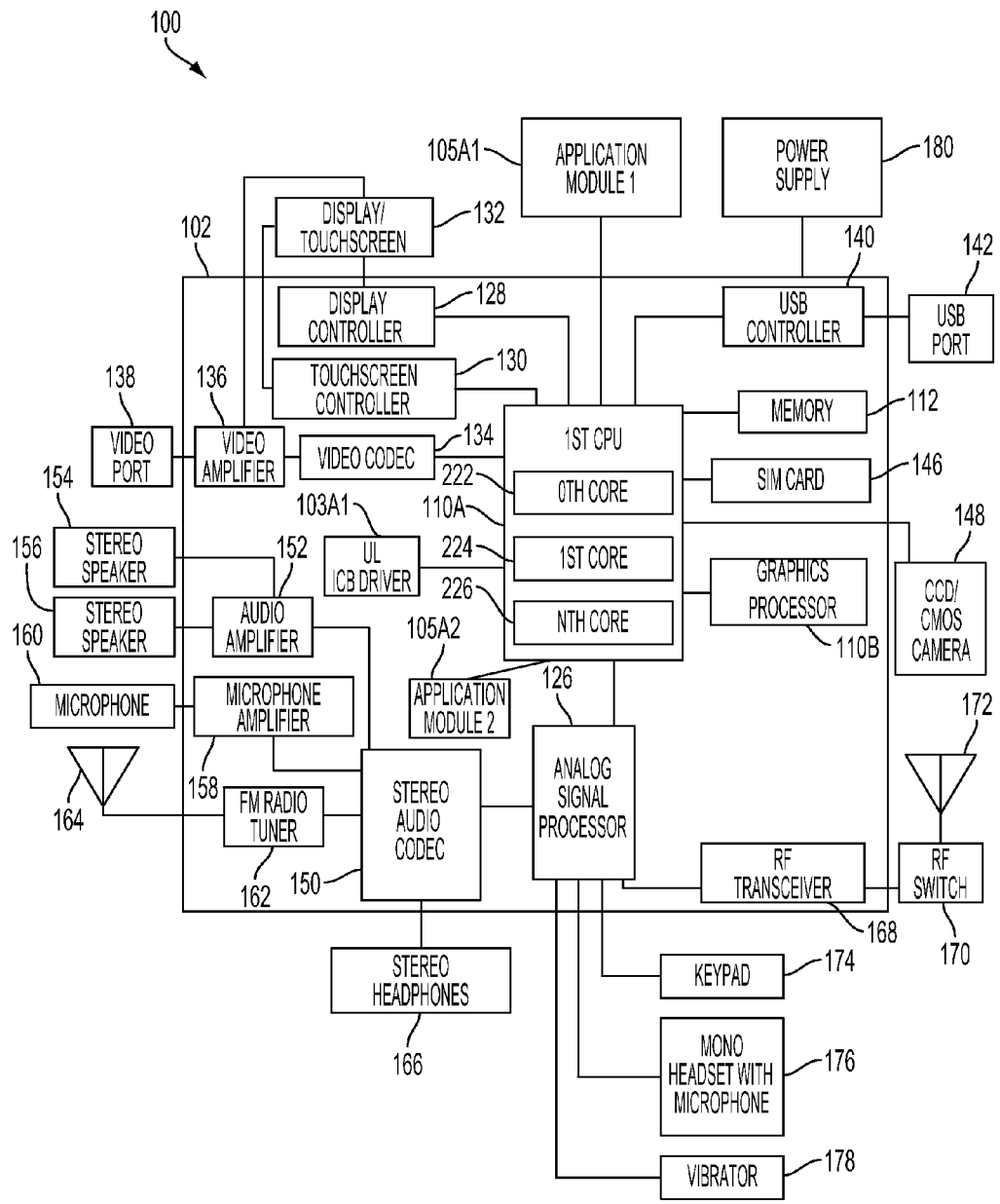
FIG. 1 is a functional block diagram illustrating exemplary elements of a system for distributed resource management in a portable computing device ("PCD")

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

FIG. 1 is a functional block diagram of an exemplary, non-limiting aspect of a PCD 100 in the form of a wireless telephone for implementing methods and systems for distributed resource management in a portable computing device. As shown, the PCD 100 includes an on-chip system 102 that has a multi-core, central processing unit ("CPU") 110A, a graphics processor 110B, and an analog signal processor 126. These processors 110A, 110B, 126 may be coupled together on one or more system busses or another interconnect architecture, as known to one of ordinary skill in the art.

The CPU 110A may comprise a zeroth core 222, a first core 224, etc., through an Nth core 226, as understood by one of ordinary skill in the art. In alternative embodiments, instead of CPU 110A and a graphics processor 110B, one or more digital signal processors ("DSPs") may also be employed as understood by one of ordinary skill in the art. Further, in alternative embodiments, two or more multi-core processors may be included.

Figure 2:
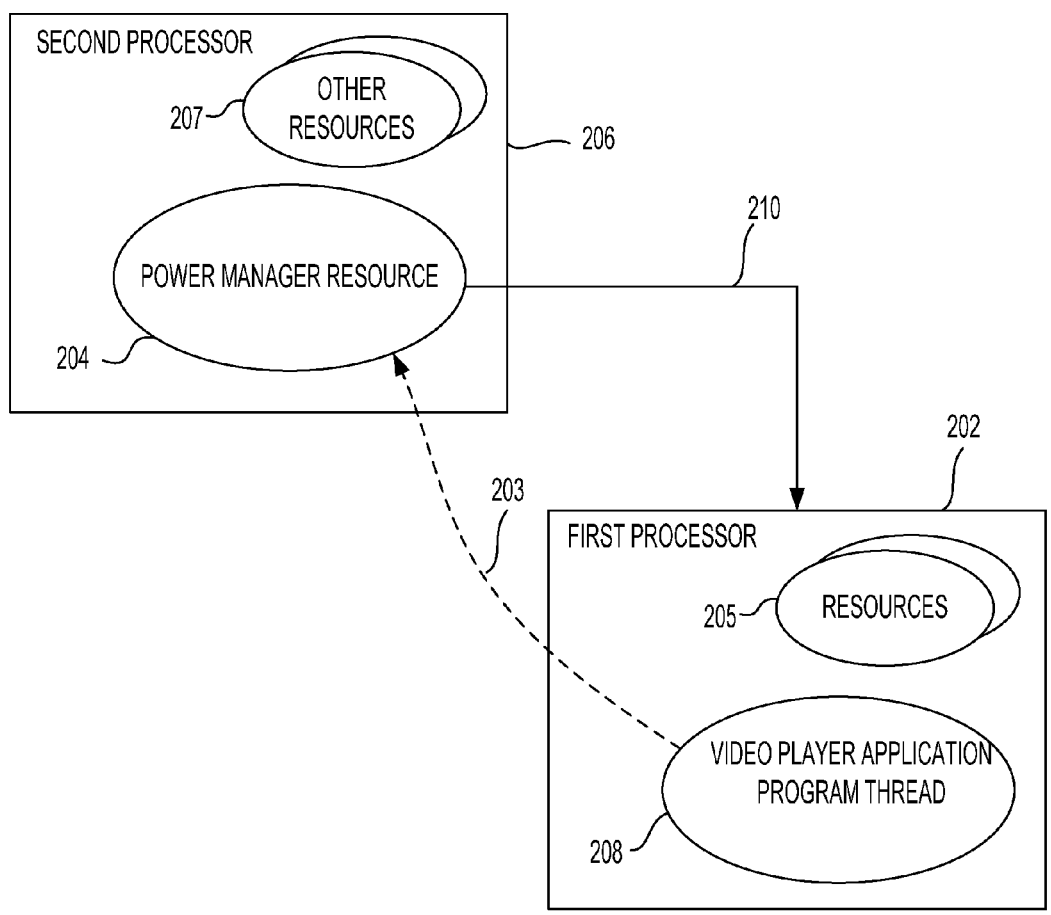
FIG. 2 is a functional block diagram illustrating an example of an instance in which a first processor needs to request a resource controlled by a second processor.

As illustrated in FIG. 1, a display controller 128 and a touchscreen controller 130 are coupled to the multi-core CPU 110A. A touchscreen display 132 external to the on-chip system 102 is coupled to the display controller 128 and the touchscreen controller 130. Also included in PCD 100 is a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multi-core central processing unit ("CPU") 110A. A video amplifier 136 is coupled to the video encoder 134 and the touchscreen display 132. A video port 138 is coupled to the video amplifier 136. As depicted in FIG. 2, a universal serial bus ("USB") controller 140 is coupled to the CPU 110A. Also, a USB port 142 is coupled to the USB controller 140. A subscriber identity module (SIM) card 146 may also be coupled to the CPU 110A. Further, as shown in FIG. 1, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable battery or a direct current ("DC") power supply that is derived from an alternating current ("AC")-to-DC transformer that is connected to an AC power source.

Some of the above-described elements of the PCD 100 may comprise hardware, while others may comprise software, and still others may comprise a combination of hardware and software. The term "resource" is used herein to refer to any such element, whether hardware, software or a combination thereof, that is controllable by a processor. A resource may be defined in one aspect as an encapsulation of the functionality of such an element. Except where it may otherwise be indicated, the term "processor" is used herein to refer to a processor such as the CPU 110, graphics processor 110B, the analog signal processor 126, or to any other processor, controller or similar element that operates under the control of software, firmware, or similar control logic.

As described in further detail below, an example of a resource is a software element that executes on a processor. A thread of execution on a processor, such as, for example, a thread relating to an executing application program, may access a resource by causing a "request" to be issued on the resource. As described below, resource requests are processed through a software-based system referred to in this disclosure as a "framework." The term "client" is used broadly in this disclosure to refer to an element that effects the function of requesting a resource. Thus, as the terms are used herein, a thread may create or make use of a client for the purpose of issuing resource requests. It should be noted that, in some instances, a resource may create or use a client, such that a resource may cause a resource request to be issued against another resource. As described in further detail below, such other resource may be referred to herein as a "dependent" resource due to a dependency relationship between the requesting resource and requested resource. Resources and clients may be represented by data structures in memory.

Since resources are controlled by specific processors in a multi-processor PCD 100, not every processor in PCD 100 has access to every resource in PCD 100. FIG. 2 illustrates an example of an instance in which it may be desirable for a first processor 202 in PCD 100 to issue a resource request 203 against a resource 204 controlled by a second processor 206 in PCD 100. Note that the first processor 202 may also control a plurality of resources 205. Likewise, the second processor 206 may control a plurality of additional resources 207.

In an instance in which the first processor 202 is executing a thread 208 relating to, for example, a video player application program, the thread 208 may call for adjustment of one or more operating parameters of the first processor 202 that enhance the performance of the first processor 202. (Although thread 208 and resource 204 are conceptually illustrated as residing in their respective processors 202 and 206 for purposes of clarity, one of ordinary skill in the art understands that such elements are executed or otherwise operated upon by the processor in the processor's memory space in accordance with well understood computing principles.) Such operating parameters may include, for example, clock speed and bus speed. For example, various processors may use the same bus clock, but only one of the processors may have direct (hardware-level) control of the bus clock. Increasing clock speed may result in better performance by, for example, a video player application program, since the playback of video is generally a more processing power-intensive task than some other tasks. As processing power is commonly expressed in millions of instructions per second ("MIPS"), the thread 208 may issue a call for a certain number of MIPS. The power manager resource 204 may include an algorithm that, in response to a request for a specified number of MIPS, causes changes in signals 210 that may represent clock speed, bus speed or other parameters that promote the first processor 202 operating at the requested MIPS level.

It may be possible for a thread to access the power manager resource 204 through an application program interface (API) specific to a bus or protocol through which the first processor 202 may communicate with the second processor 206. However, the framework described below may provide a more uniform way to handle resource requests than a resource-specific and bus-specific API. As described below, via the framework, resource requests are issued and serviced in a uniform manner without regard to whether the request is against a resource controlled by the same processor from which the resource request is issued or against a resource controlled by a different processor. A resource controlled by the same processor from which the resource request is issued may be referred to as a "native" resource. A resource controlled by a processor other than that from which the resource request is issued may be referred to herein as a "remote resource" or "distributed resource."

Figure 3:
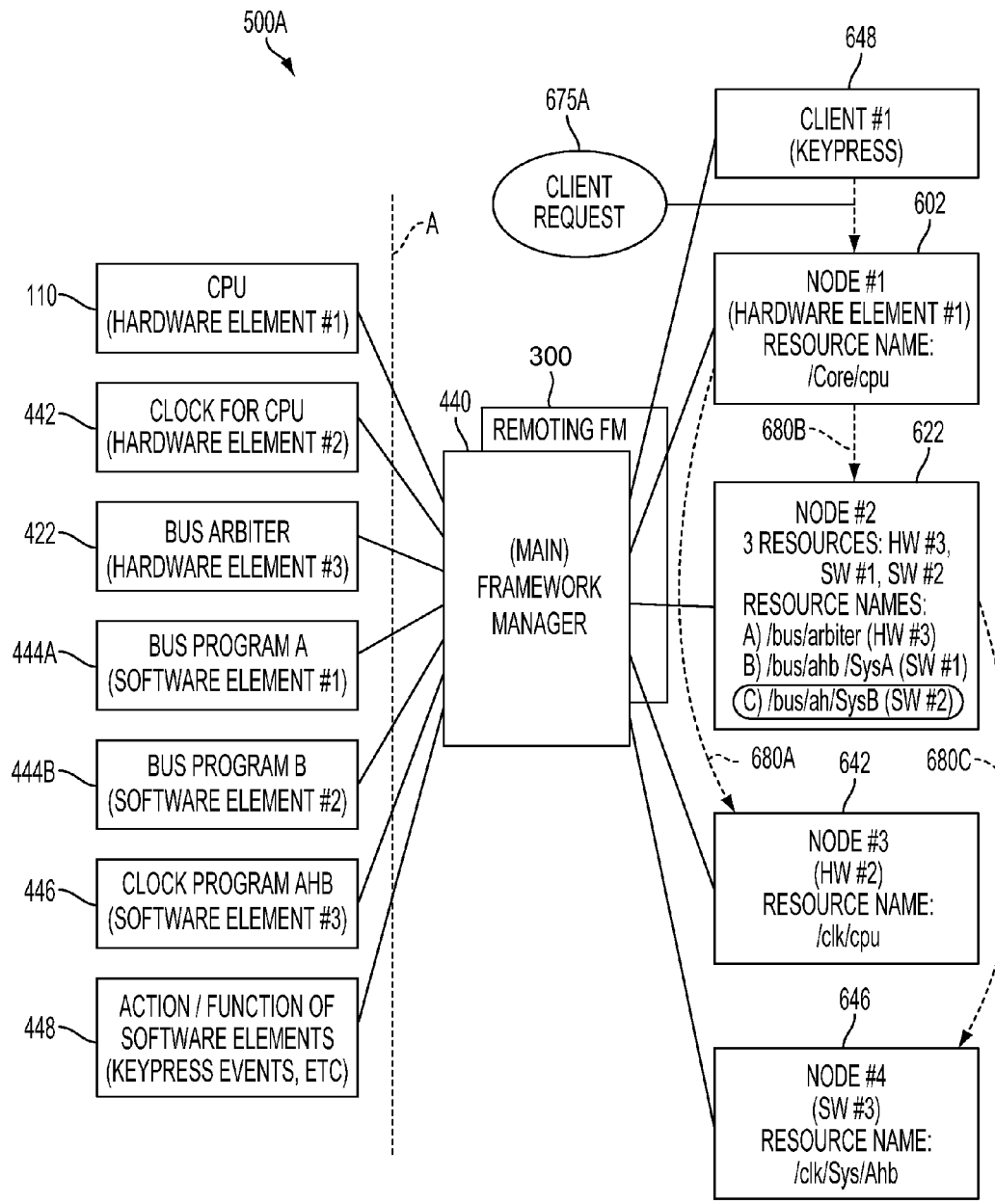
FIG. 3 is a diagram of a first aspect of a node architecture that manages resources of a PCD.

FIG. 3 is a diagram comprising functional blocks which represent software or hardware (or both) of the PCD 100. The blocks to the left of the line "A" represent resources of the PCD 100 that are controlled by the CPU 110A. Such resources may include: the CPU 110A itself, also referred to generally as the first hardware element (hardware element #1); a clock 442 for the CPU 110A, also referred to generally as the second hardware element (hardware element #2); a bus arbiter or scheduler 422, also referred to generally as the third hardware element (hardware element #3); a bus program A—444A, also referred to generally as the first software element (software element #1); a bus program B—444B, also referred to generally as the second software element (software element #2); a clock program AHB, referred to generally as the third software element (software element #3); and an action or function monitored by a software element generally indicated as a keypress 448. The CPU 110A controls or has access to the above-referenced resources because the resources are within the memory space of the CPU 110A and no other restrictions, such as security restrictions, exist that would inhibit CPU 110A from accessing those resources. For example, CPU 110A may be capable of controlling or accessing hardware registers of those resources. It should be noted that PCD 100 may include other CPUs 110 (see, e.g., FIG. 2) that control or have access to resources other than the above-referenced resources.

A framework manager 440, which may comprise a library of computer instructions, manages nodes that encapsulate functionality of the resources. That is, the nodes may be accessed to indirectly access the resources. For convenience, a node encapsulating the functionality of a resource may be referred to herein as including, comprising, having, etc., the resource. Each node may include one or more resources. The nodes may be defined in software code, firmware, or a similar medium, and instantiated as data structures in, for example, memory 112 (FIG. 1) during operation of the PCD 100. The nodes 601 may be instantiated during a start-up, power-up, initialization, boot-up, etc., sequence, or at any other suitable time during operation of the PCD 100. It should be noted that a reference herein to instantiating, issuing a request on, or otherwise interacting with a resource should be understood as meaning interacting with a node that includes that resource. For the remainder of this disclosure, a generic or non-specific node will be designated with reference numeral 601 as described below with reference to FIG. 5.

Nodes 601 may include, for example, a first node 602 having a single resource that generally corresponds with the first hardware element or central processing unit 110. With the software architecture described in this disclosure, each resource of a node 601 may be provided with a unique name comprising one or more alphanumeric characters. In the exemplary embodiment illustrated in FIG. 3, the resource of the first node 602 has been assigned the resource name of "/core/cpu." This exemplary resource name generally corresponds to conventional file naming structures known to one of ordinary skill in the art. However, as recognized by one of ordinary skill the art, other types of resource names containing any other combination of alpha-numeric characters and/ or symbols are well within the scope of this disclosure.

Nodes 601 may further include, for example, a second node 622 having a plurality of resources. In this exemplary embodiment, the second node 622 has a first resource comprising a single hardware element corresponding to the bus arbiter or scheduler 422. The second resource of the second node 622 comprises a software element generally corresponding to the first software element of the bus program A 444A. The third resource of the second node 622 comprises another software element generally corresponding to the second software element of the bus program B 444B. One of ordinary skill in the art recognizes that any combination and any number of resources and resource types for a given node 601 are well within the scope of this disclosure.

FIG. 3 also illustrates a first client 648 that generally corresponds to an action or function of the two software elements 448, 450. In the exemplary embodiment illustrated in FIG. 3, the first client 648 generally corresponds to a keypress action that may occur within a particular application program module 105 supported by the portable computing device 100. However, one of ordinary skill in the art recognizes that other actions and/or functions of software elements besides keypresses are well within the scope of this disclosure. Further details about client requests 648 and their respective creation will be described below in connection with FIG. 11.

FIG. 3 also illustrates relationships between particular architectural elements. For example, FIG. 3 illustrates a relationship between the client 648 and the first node 602. Specifically, the first client 648 may generate a client request 675A, illustrated with dashed lines, which is managed or handled by the first node 602 that comprises the resource "/core/cpu." Typically, there are a predetermined or set number of types of client requests 675. Client requests 675 will be described in further detail below in connection with FIG. 11.

Other relationships displayed in FIG. 3 include dependencies illustrated with dashed lines 680. Dependencies are relationships between respective resources of another node 601. A dependency relationship usually indicates that a first resource (A) is reliant upon a second resource (B) that may provide the first resource (A) with information or implement some behavior. This information may be a result of an operation performed by a second resource (B) or it may simply comprise status information that is needed by the first resource (A) or any combination thereof. The first resource (A) and second resource (B) may be part of the same node 601 or they may be part of different nodes 601. It should be noted that client requests 675 may originate not only from threads of execution, such as in the example of the above-described keypress action, but also from other nodes 601. To obtain information or behavior from a dependent node 601, a node 601 may issue a client request 675 to its dependent node 601. Thus, the dashed lines 680 that indicate dependencies may also indicate the direction of potential client requests 675.

In FIG. 3, the first node 602 is dependent upon the second node 622 as indicated by the dependency arrow 680B which originates with the first node 602 and extends to the second at 622. FIG. 3 also illustrates that the first node 602 is also dependent upon the third node 642 as illustrated by the dependency arrow 680A. FIG. 3 also illustrates that the second node 622 is dependent upon the fourth node 646 as illustrated by the dependency arrow 680C. One of ordinary skill in the art recognizes that the dependencies 680 illustrated with the dashed arrows of FIG. 3 are only exemplary in nature and that other combinations of dependencies between respective nodes 601 are within the scope of this disclosure.

The framework manager 440 is responsible for maintaining the relationships described above, that include, but are not limited to, the client requests 675 and the dependencies 680 illustrated in FIG. 3. Some such relationships, such as dependencies, exist at a PCD start-up time (i.e., power-up, initialization, boot-up, etc.) by virtue of the way the resources and their nodes 601 have been defined in the software code in PCD 100 that the framework manager 440 accesses at such a start-up time to begin the node instantiation process. Other such relationships, such as client requests 675, arise after nodes 601 have been instantiated, such as during execution of an application program thread in which an application program invokes a resource. Whether client requests 675 originate from executing application program threads or similar elements other than nodes 601 (e.g., client request 675A) or originate from a node 601, client requests 675 are directed through the framework manager 440. The framework manager 440 directs the transfer of information among the nodes 601. Conceptually, the framework manager 440 serves as a matrix through which multiple threads may essentially concurrently communicate with the nodes 601. Though different threads may involve different data, the same framework manager software code may service multiple threads.

As described below in further detail, the framework manager 440 may instantiate a node 601 as soon as the node's dependent nodes are instantiated, i.e., when the dependencies 680 for any given node 601 have been resolved. The framework manager 440 attempts to instantiate all nodes 601 that have been defined in the software architecture of PCD 100. A dependency 680 is completed or resolved when a resource that supports a dependency is in existence or is in a ready state for handling information that relates to the dependency 680.

For example, the first node 602 comprising the single resource "/core/cpu" may not be instantiated by the framework manager 440 if the third node 642 comprising the single resource "/clk/cpu" has not been instantiated because of the dependency relationship 680A that exists between the first node 602 and the third node 642. Once the third node 642 has been instantiated by the framework manager 440, then the framework manager 440 may instantiate the second node 602 because of the dependency relationship 680A.

If the framework manager 440 is unable to instantiate a particular node 601 because one or more of its dependencies 680 are incomplete or unresolved, the framework manager 440 will continue running or executing steps corresponding to those nodes 601 that were instantiated successfully. The framework manger 440 will usually skip over a call for a particular node 601 that may not exist due to incomplete dependencies in which dependent resources have not been created, and return messages to that call which reflect that incomplete status.

In a multi-core environment, such as illustrated in FIG. 1, the framework manager 440 may create or instantiate nodes 601 on separate cores, such as the 0th, first and Nth cores 222, 224, and 226 of FIG. 1. Nodes 601 may generally be created in a multi-core environment on separate cores and in parallel as long as the nodes 601 are not dependent on one another and if all of a particular node's corresponding dependencies, as described below, are complete. In a multi-processor environment, the nodes 601 may be created or instantiated on various processors, such as the CPU 110A, graphics processor 110B, etc., of FIG. 1. That is, some nodes 601 may exist in the memory space of one processor, while other nodes 601 may exist in the memory space of another processor. It should be noted, however, that nodes 601 on one processor may not be accessible to nodes 601 on the other processor via only framework manager 440.

A remoting framework manager 300 that is similar to the above-described (main) framework manager 440 may exist in parallel with and as an extension to the framework manager 440. The remoting framework manager 300 cooperates with or works with the framework manager 440 to coordinate inter-processor information transfers between nodes 601 on different processors. That is, the remoting framework manager 300 helps framework manager 440 maintain the relationships described above, such as dependencies and client requests, in instances in which the nodes 601 that are involved exist on different processors. Thus, nodes 601 on one processor may not rendered accessible to nodes 601 on another other processor via the combined effect of framework managers 440 and 300. Moreover, the combination of framework managers 440 and 300 may perform all of the functions ascribed in this disclosure to framework manager 440, whether the nodes 601 that are involved exist on the same processor different processors. In such a multi-processor embodiment, individual copies of the software that framework managers 300 and 440 comprise may reside in the domain of each of the processors. Thus, each processor has access to the same framework manager software.

Figure 4:
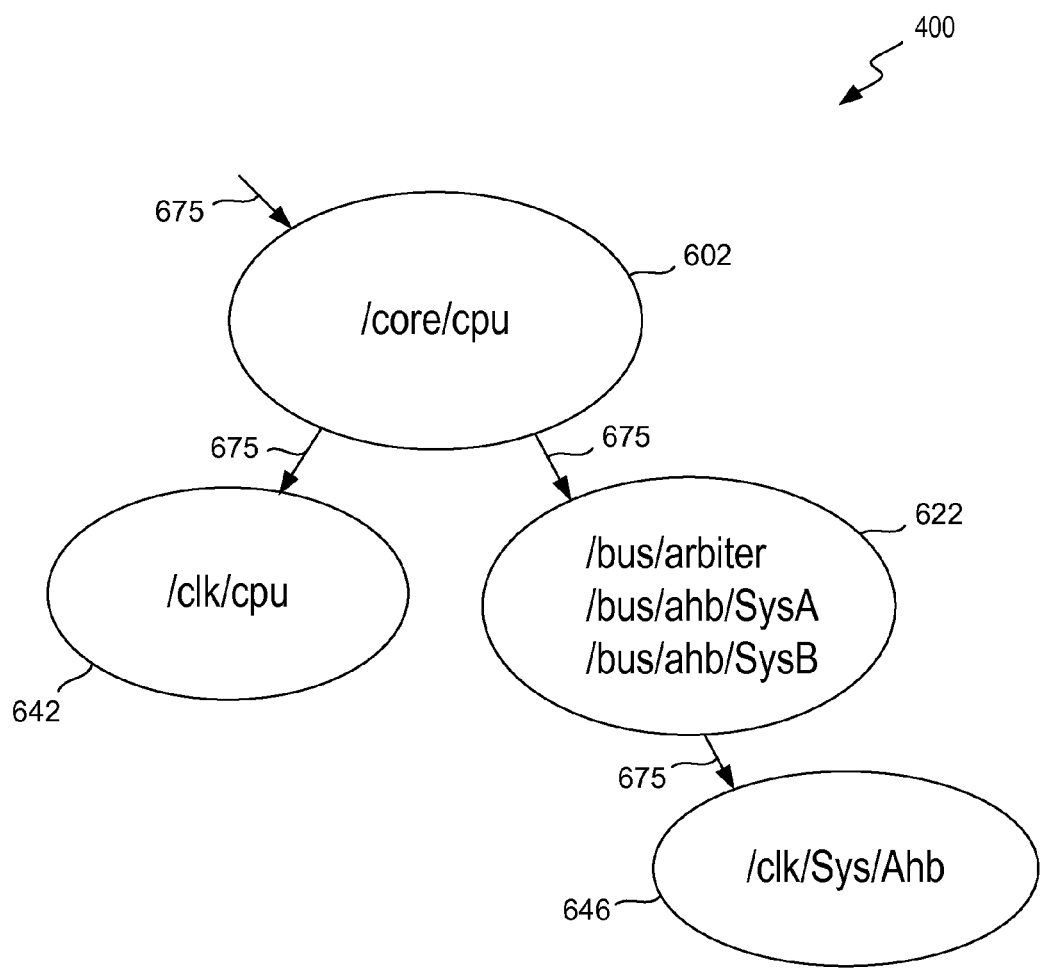
FIG. 4 is a directed acyclic resource graph for a group of exemplary resources of a PCD.

FIG. 4 conveniently reorganizes the above-described nodes 602, 622, 642 and 646 in the form of a directed acyclic graph ("DAG") 400. The graph 400 is another way of defining the software architecture described above. In the lexicon of graph theory, the vertices of the graph 400 correspond to the nodes 601, the edges of the graph 400 correspond to client requests 675, and adjacent nodes or vertices represent resource dependencies. One of ordinary skill in the art will recognize that the graph 400 is a directed graph as a result of the dependencies and is acyclic because the framework manager 440 prevents a cycle from being defined in which resource A depends on resource B and resource B depends on resource A. That is, the framework manager 440 will not instantiate two nodes 601 that are (erroneously) defined to depend on each other. The acyclic property of the graph is important to prevent deadlocks, since, as described below, each node 601 is locked (in a transaction processing sense) when it is accessed. If two nodes 601 were to depend on each other in an instance in which a first thread were to access and lock one of these two nodes 601 at the same time that a second thread were to access and lock the other of these two nodes 601, both threads would be hung. However, in the relatively rare instances in which a software developer or other such person involved in defining the software architecture deems it desirable to define in the software architecture two resources that depend on each other, the two (or more) resources may be included in the same node 601 as each other. Two resources in the same node will share the same lock state. It is at least in part for this reason that a software developer or other such person may choose to define a plural-resource node such as node 622 in the architecture.

Although this disclosure may, for purposes of clarity and convenience, reference a "node" 601 rather than a "resource" of the node 601, it should be understood that client requests may be directed to specified resources rather than nodes. In other words, a node 601, which, as described above, may be a data structure encapsulating of the functionality of one or more resources, may be transparent from the perspective of a client or other issuer of a client request such as another node 601. From the perspective of a client, a request is issued against a resource rather than a node. Likewise, from the perspective of a client, a state query, event, or other element of the architecture is associated with a resource rather than a node.

A resource graph such as the exemplary graph 400 is useful for understanding the instantiation of nodes 601 in accordance with dependencies, described below with regard to FIGS. 6-10. Leaf nodes, such as the nodes 642 and 646, are instantiated before non-leaf nodes, because leaf nodes have no dependencies. In general a node 601 must be instantiated before a node that depends on it may be instantiated. Furthermore, it can be seen that servicing a resource request corresponds to traversing a directed acyclic graph in which the vertices correspond to the nodes 601, the edges correspond to client requests 675, and adjacent nodes or vertices represent resource dependencies.

In a multi-processor PCD 100, a first processor may have access to or be capable of controlling a first set of nodes 601 in a first resource graph, while a second processor may have access to or be capable of controlling a second set of nodes 601 in a second resource graph, where the first and second resource graphs do not share any resources, i.e., they are mutually exclusive resource graphs. That is, in such an environment, each processor has its own resource graph that defines relationships among resources and other elements that are not accessible to other processors. The distributed resource management of the present disclosure relates to maintaining the relationships described above, such as dependencies and client requests, in instances in which two or more processors each have access to resources in their own resource graphs and do not have access to resources in other processors' resource graphs.

The above-referenced limitation upon access to resources may, in some embodiments, be limited by hardware configuration. That is, a processor may have no means by which it can affect a hardware device, such as a register, because the hardware device is controlled by or in the memory space of another processor. Alternatively, or in addition, the limitation upon access to resources may be imposed in software, for reasons such as minimizing exposure of a processor to security risks (e.g., a virus that may be infecting another processor).

Figure 5:
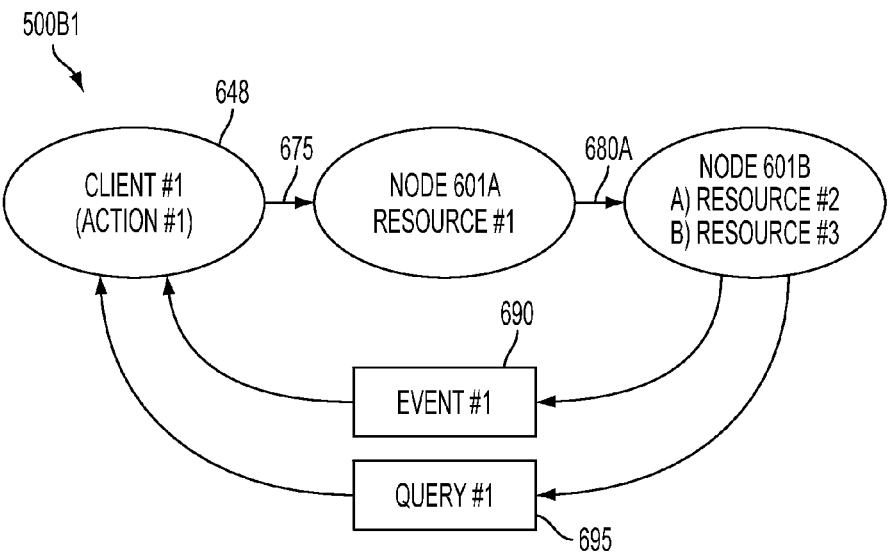
FIG. 5 is a general diagram of a second aspect of the node architecture that manages resources of a PCD.

FIG. 5 is a general diagram of another aspect of a software architecture 500B1 for a system that manages resources of a PCD 100 of FIG. 1. This aspect is described for purposes of clarity in the context of a PCD 100 and architecture in which all resources and other elements that are involved are controlled by the same processor, i.e., they are included in the same resource graph. In this general diagram, the one or more resources of each node 601 have not been provided with unique names. The node or resource graph 500B1 of FIG. 5 comprises only the nodes 601, clients 648, events 690, and query functions 695 supported by the architecture or framework manager 440. Each node 601 has been illustrated with an oval shape and arrows 680 with specific directions which represent respective dependencies between resources within a node 601.

FIG. 5 also illustrates how a client 648 of the first node 601A may issue a client request 675 to the first node 601A. After these client requests 675 are issued, the second node 601B may trigger an event 690 or provide a response to a query 695, in which messages corresponding to the event 690 and the query 695 flow back to the client 648.

Figure 6:
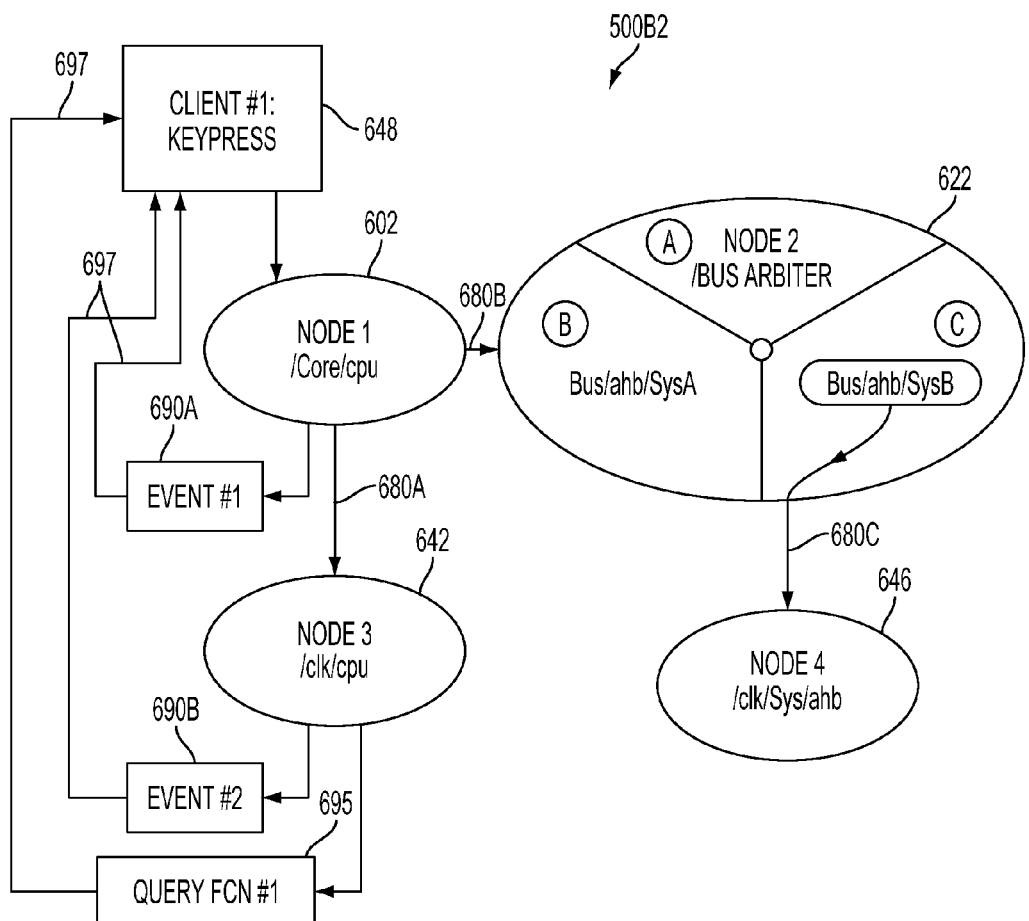
FIG. 6 is specific diagram of a second aspect of the node architecture that manages resources of a PCD.

FIG. 6 is a more specific diagram of the above-described aspect of the software architecture 500B2 for a system that manages resources of a PCD 100 of FIG. 1. FIG. 6 illustrates a node or resource graph 500B2 that comprises only the nodes 601 with specific, yet exemplary resource names, as well as clients 648, events 690, and query functions 695 corresponding to those of FIG. 3. Each node 601 has been illustrated with an oval shape and arrows 680 with specific directions which represent respective dependencies between resources within a node 601.

For example, the first node 602 has a dependency arrow 680B to indicate that the first node 602 is dependent upon the three resources of the second node 622. Similarly, the third resource "/bus/ahb/sysB/" comprising the second software element 444B and generally designated with the reference letter "C" in FIG. 11C has a dependency arrow 680C that indicates this third resource (C) is dependent upon the single "/clk/sys/ahb" resource of the fourth node 646.

FIG. 6 also illustrates the output data from nodes 601 which may comprise one or more events 690 or query functions 695. A query function 695 is similar to an event 690. The query function 695 may have a query handle that may or may not be unique. The query function is generally not externally identified and generally it does not have a state. The query function 695 may be used to determine the state of a particular resource of a node 601. The query function 695 and the events 690 may have relationships with an established client 648 and these relationships are represented by directional arrows 697 to indicate that information from respective event 690 and query function 695 are passed to a particular client 648.

The node or resource graphs 500B of FIG. 5-6 represent relationships which exist in memory under the control of a processor and which are managed by the framework manager 440. The node or resource graph 500B may be automatically generated by the framework manager 440 as a useful tool for identifying relationships between respective elements managed by the framework manager 440 and for troubleshooting by a software team.

Figure 7:
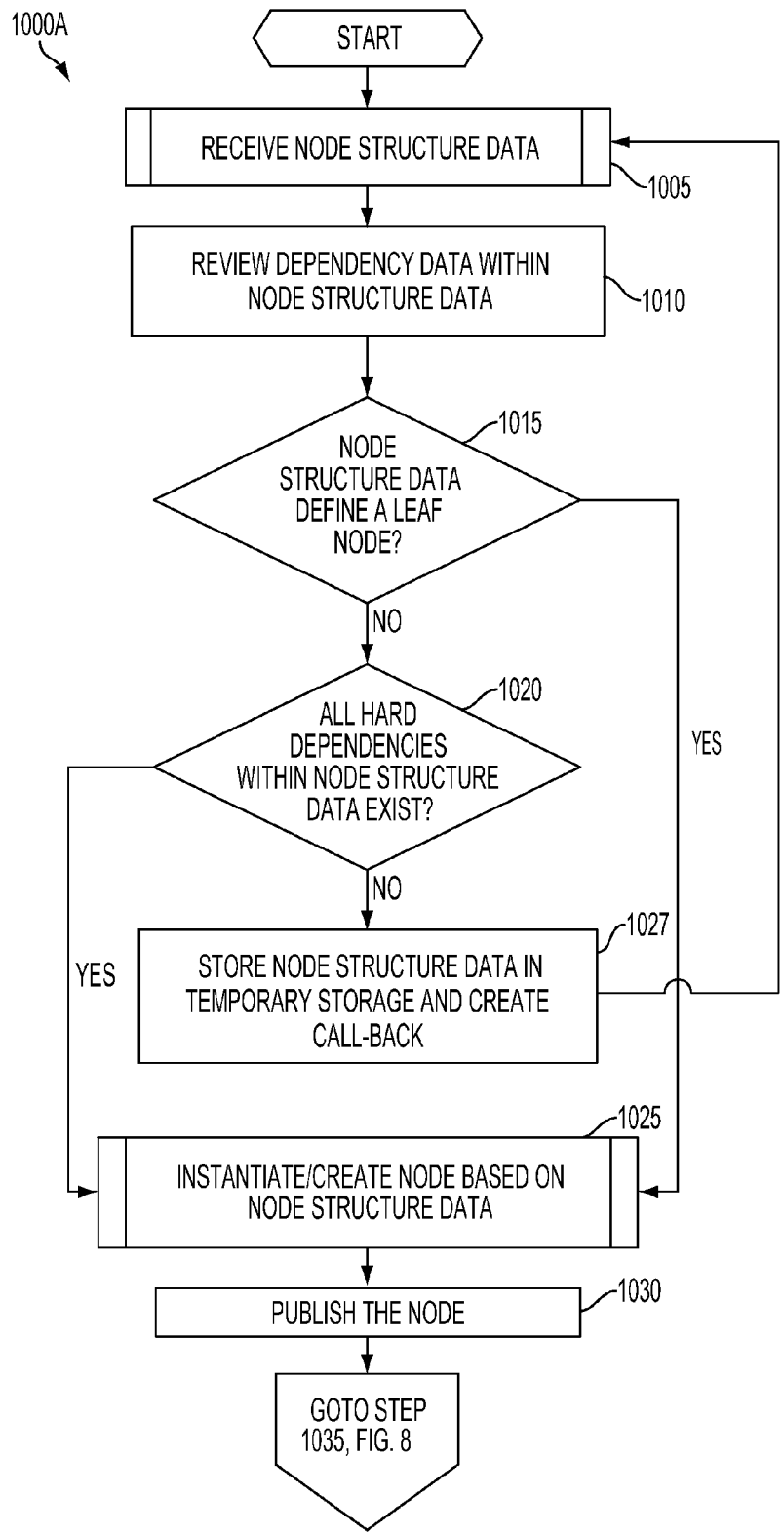
FIG. 7 is a flowchart illustrating a method for creating a node architecture for managing resources of a PCD.

FIG. 7 is a flowchart illustrating a method 1000A for creating or instantiating software structures for managing resource(s) of a PCD 100. This method is described for purposes of clarity in the context of an architecture in which all resources and other elements that are involved are controlled by the same processor, i.e., they are included in the same resource graph. Block 1005 is the first routine of the method or process 1000 for managing resources of a PCD 100. In block 1005, a routine may be executed or run by the framework manager 440 for receiving node structure data. The node structure data may comprise a dependency array that outlines the dependencies a particular node 601 may have with other nodes 601. Further details about node structure data and this routine or submethod 705 will be described in more detail below in connection with FIG. 9.

Next, in block 1010, the framework manager 440 may review the dependency data that is part of the node structure data received in block 1005. In decision block 1015, the framework manager 440 may determine if the node structure data defines a leaf node 601. A leaf node 601 generally means that the node to be created based on the node structure data does not have any dependencies, such as the nodes 642 and 646 in FIGS. 3-4. If the inquiry to decision block 1015 is positive, meaning that the node structure data for creating the current node does not have any dependencies, then the framework manager 440 continues to routine block 1025.

If the inquiry to decision block 1015 is negative, then the "No" branch is followed to decision block 1020 in which the framework manager 440 determines if all of the hard dependencies within the node structure data exist. A hard dependency may comprise one in which a resource cannot exist without it. Meanwhile, a soft dependency may comprise one in which a resource may use the dependent resource as an optional step. A soft dependency means that a node 601 or resource of the node 601 which has a soft dependency may be created or instantiated within the node architecture even when the soft dependency does not exist.

An example of a soft dependency may comprise an optimization feature that is not critical to the operation for a resource oriented node 601 containing multiple resources. The framework manager 440 may create or instantiate a node or a resource for all hard dependencies that are present even when a soft is dependency is not present for those nodes or resources which have soft dependencies that are not created. A call back feature may be used to reference the soft dependency so that when the soft dependency becomes available to the framework manager 440, the framework manager 440 will inform each callback referencing the soft dependency that the soft dependencies are now available.

If the inquiry to decision block 1020 is negative, then the "No" branch is followed to block 1027 in which the node structure data is stored by the framework manager 440 in temporary storage such as memory and the framework manager 440 creates a call back feature associated with this un-instantiated node.

If the inquiry to decision block 1015 is positive, then the "Yes" branch is followed to routine 1025 in which a node 601 is created or instantiated based on the node structure data received in routine block 1005. Further details of routine block 1025 will be described below in connection with FIG. 9. Next, in block 1030, the framework manager 440 publishes the newly created node 601 using its unique resource name(s) so that other nodes 601 may send information to or receive information from the newly created node 601.

Figure 8:
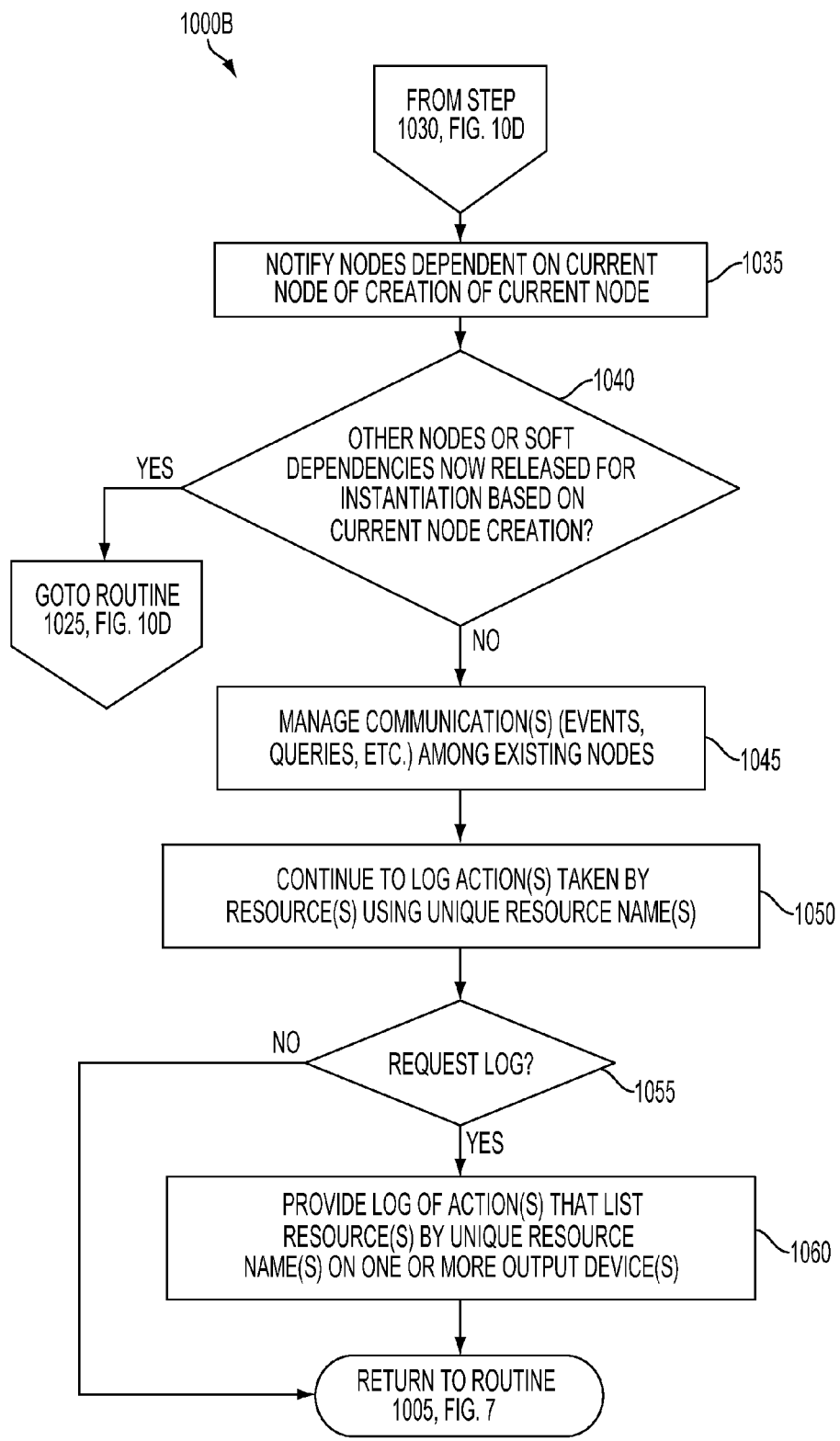
FIG. 8 is a continuation flowchart of FIG. 7 illustrating a method for creating a node architecture for managing resources of a PCD.

Referring now to FIG. 8, which is a continuation flow chart of FIG. 7, in block 1035, the framework manager 440 notifies other nodes 601 which are dependent on the newly created node 601 that the newly created node 601 has been instantiated and is ready to receive or transmit information. According to one exemplary aspect, notifications are triggered immediately when a dependent node, like node 601B of FIG. 5, is created, i.e., the notifications are performed recursively. So if node 601B of FIG. 5 is constructed, node 601A is immediately notified. This notification may allow node 601A to be constructed (since node 601B was node 601A's final dependency). Construction of node 601B may cause other nodes 601 to be notified, and so on. Node 601B does not get completed until the final resource dependent on node 601B is completed.

A second, slightly more complex, implementation is to put all of the notifications onto a separate notification queue, and then run through the queue beginning at a single point in time, i.e., the notifications are performed iteratively. So when node 601B of FIG. 5 is constructed, the notification to node 601A is pushed onto a list. Then that list is executed and node 601A is notified. This causes the notification to other additional nodes 601 (besides node 601A, not illustrated in FIG. 5) to be put on the same list, and that notification is then sent after the notification to node 601A is sent. The notifications to other nodes 601 (besides the notification to node 601A) does not occur until after all the work associated with node 601B and node 601A has been completed.

Logically, these two implementations are equivalent, but they have different memory consumption properties when implemented. The recursive realization is simple but can consume an arbitrary amount of stack space, with the stack consumption being a function of the depth of the dependency graph. The iterative implementation is slightly more complex and requires a bit more static memory (the notification list), but stack usage is constant irrespective of the depth of a dependency graph, such as illustrated in FIG. 5.

Also, notification of node creation in block 1035 is not limited to other nodes. It may also used internally for alias construction. Any arbitrary element in the system 500A may use the same mechanism to request for notification when a node becomes available, not just other nodes. Both nodes and non-nodes may use the same notification mechanism.

In decision block 1040, the framework manager 440 determines if other nodes 601 or soft dependencies are now released for creation or instantiation based on the creation of the current node 601. Decision block 1040 generally determines whether resources may be created because certain dependency relationships 680 have been fulfilled by the current node which has recently undergone creation or instantiation.

If the inquiry to decision block 1040 is positive, then the "Yes" branch is followed back to routine block 1025 in which the released node 601 may now be created or instantiated because of the fulfillment of a dependency by the node 601 that was just created.

If the inquiry to decision block 1040 is negative, then the "No" branch is followed to block 1045 in which the frame work manager 440 may manage communications between elements of the software architecture as illustrated in FIG. 2. Next, in block 1050, the framework manager 440 may continue to log or record actions taken by resources by using the resource names associated with a particular resource. Block 1045 may be executed by the framework manager 440 after any action taken by the framework manager 440 or any of the elements managed by the framework manager 440, such as the resources, nodes 601, clients 648, events 695, and query functions 697. Block 1045 shows another aspect of the node architecture in which the framework manager 440 may maintain a running log of activity that lists actions performed by each element according to their unique identifier or name provided by the authors who created a particular element, such as a resource of a node 601.

Compared to the prior art, this logging of activity in block 1050 that lists unique names assigned to each resource of a system is unique and may provide significant advantages such as used in debugging and error troubleshooting. Another unique aspect of the node architecture 500A is that separate teams may work on different hardware and/or software elements independently of one another in which each team will be able to use resource names that are unique and easy to track without the need for creating tables to translate less meaningful and usually confusing resource names assigned by other teams and/or the original equipment manufacturer (OEM).

Next, in decision block 1055, the framework manager 440 determines if a log of activity recorded by the framework manager 440 has been requested. If the inquiry to decision block 1055 is negative, then the "No" branch is followed to the end of the process in which the process returns back to routine 1005. If the inquiry to decision block 1055 is positive, then the "Yes" branch is followed to block 1060 in which the framework manager 440 sends the activity log comprising meaningful resource names and respective actions performed by the resource names to an output device, such as a printer or a display screen and/or both. The process then returns to routine block 1005 described above.

Figure 9:
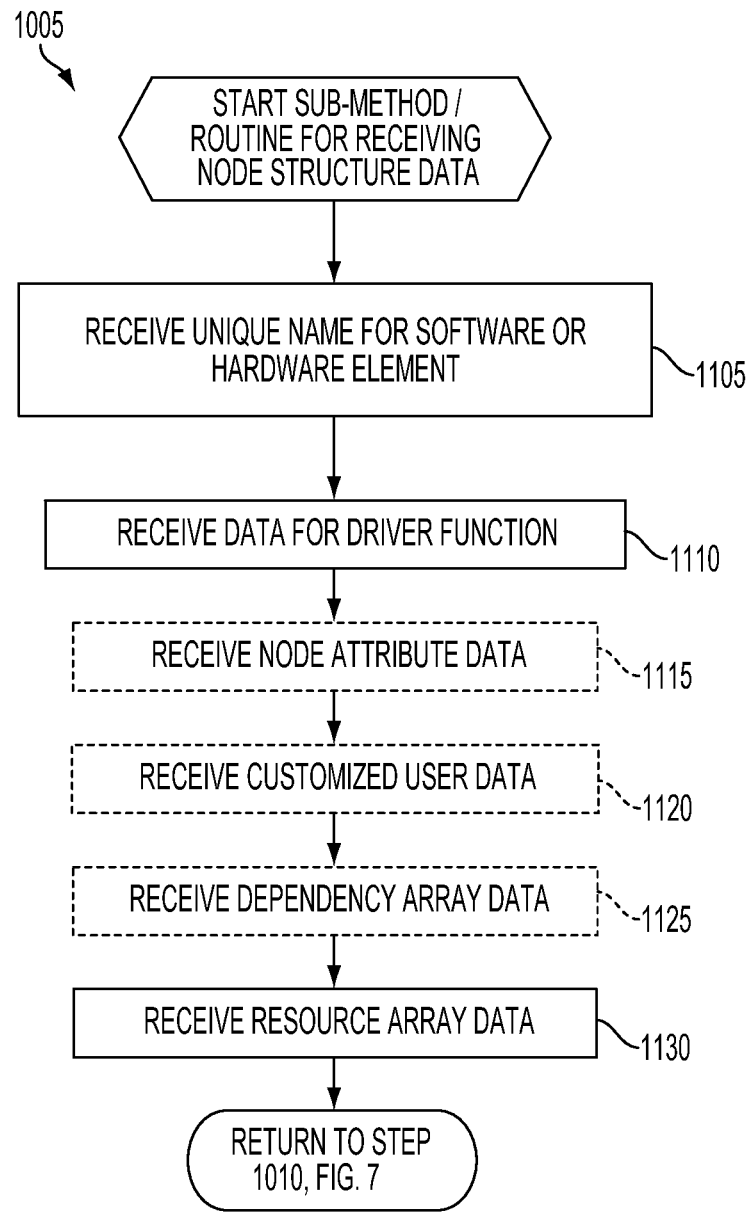
FIG. 9 is a flowchart illustrating a sub-method or a routine of FIGS. 7-8 for receiving node structure data in a software architecture for a PCD.

FIG. 9 is a flowchart illustrating a sub-method or a routine 1005 of FIG. 7 for receiving node structure data that defines a software architecture of a PCD 100. The receiving method may occur at any suitable time, such as, for example, when the PCD 100 is started up or initialized. In such an instance, the node structure data is received when a processor reads the corresponding software code from memory in preparation for instantiating the nodes 601 in accordance with the architecture. Block 1105 is the first step in the sub method or routine 1005 of FIG. 7. In block 1105, the framework manager 440 may receive a unique name for a software or hardware element, such as the CPU 110 and the clock 442 of FIG. 7. As discussed previously, a node 601 must reference at least one resource. Each resource has a unique name in the system 500A. Each element within the system 500A may be identified with a unique name. Each element has a unique name from a character perspective. In other words, generally, there are no two elements within the system 500A which have the same name. According to exemplary aspects of the system, resources of nodes 601 may generally have unique names across the system, but it is not required that client or event names be unique, though they may be unique as desired.

For convenience, a conventional tree file naming structure or file naming "metaphor" that employs forward slash "I" characters for creating unique names may be employed, such as, but not limited to, "/core/cpu" for CPU 110 and "/clk/cpu" for clock 442. However, as recognized by one of ordinary skill the art, other types of resource names containing any other combination of alphanumeric characters and/or symbols are well within the scope of this disclosure.

Next, in block 1110, the framework manager 440 may receive data for one or more driver functions associated with one or more resources of the node 601 being created. A driver function generally comprises the action to be completed by one or more resources for a particular node 601. For example, in FIGS. 7A-7B, the driver function for the resource /core/cpu of node 602 may request the amount of bus bandwidth and the CPU clock frequency it requires in order to provide the requested amount of processing that has been requested. These requests would be made via clients of the resources in nodes 642 and node 622. The driver function for /clk/cpu in node 642 would usually be responsible for actually setting the physical clock frequency in accordance with the request it received from the /core/cpu resource of node 602.

In block 1115, the framework manager 440 may receive node attribute data. The node attribute data generally comprises data that defines the node policies such as security (can the node be accessed via user space applications), remotability (can the node be accessed from other processors in the system) and accessibility (can the resource support multiple concurrent clients). The framework manager 440 may also define attributes that allow a resource to override default framework behavior, such as request evaluation or logging policy.

Subsequently, in block 1120, the framework manager 440 may receive customized user data for the particular node 601 being created. The user data may comprise a void "star" field as understood by one of ordinary skill in the art with respect to the "C" programming language. User data is also known to one of ordinary skill in the art as a "trust me" field. Exemplary customized user data may include, but is not limited to, tables such as frequency tables, register maps, etc. The user data received in block 1120 is not referenced by the system 500A, but allows for customization of a resource if the customization is not recognized or fully supported by the framework manager 440. This user data structure is a base class in the "C" programming language intended to be extended for particular or specific uses.

One of ordinary skill the art recognizes that other kinds of data structures for extending specific uses of a particular class are within the scope of this disclosure. For example, in the programming language of "C++" (C-plus-plus), an equivalent structure may comprise the key word "public" which would become an extension mechanism for a resource within a node 601.

Next, in block 1125, the framework manager 440 may receive dependency array data. The dependency array data may comprise the unique and specific names of one or more resources 601 on which the node 601 being created is dependent. For example, if the first node 602 of FIG. 6 was being created, then in this block 1125, the dependency array data may comprise the resource names of the three resources of the second node 622 and the single resource name of the third node 642 on which the first node 602 is dependent.

Subsequently, in block 1130, the framework manager 440 may receive resource array data. The resource array data may comprise parameters for the current node being created, such as parameters relevant to the first node 602 of FIGS. 7B-7C if this first node 602 was being created. The resource array data may comprise one or more of the following data: the names of other resources; unit; maximum value; resource attributes; plug-in data; and any customized resource data similar to the customize user data of block 1120. The plug-in data generally identifies functions retrieved from a software library and usually lists the client types that may be supported by the particular node or plurality of nodes being created. The plug-in data also allows for customization of client creation and destruction. After block 1130, the process returns to block 1010 of FIG. 7.

In FIG. 9, the attribute data block 1115, customized user data block 1120, and the dependency array data block 1125 have been illustrated with dashed lines to indicate that these particular steps are optional and not required for any given node 601. Meanwhile, the unique name block 1105, a driver function block 1110, and resource array data block 1130 have been illustrated with solid lines to indicate that these steps of routine 1005 are generally important for creating a node 601.

Figure 10:
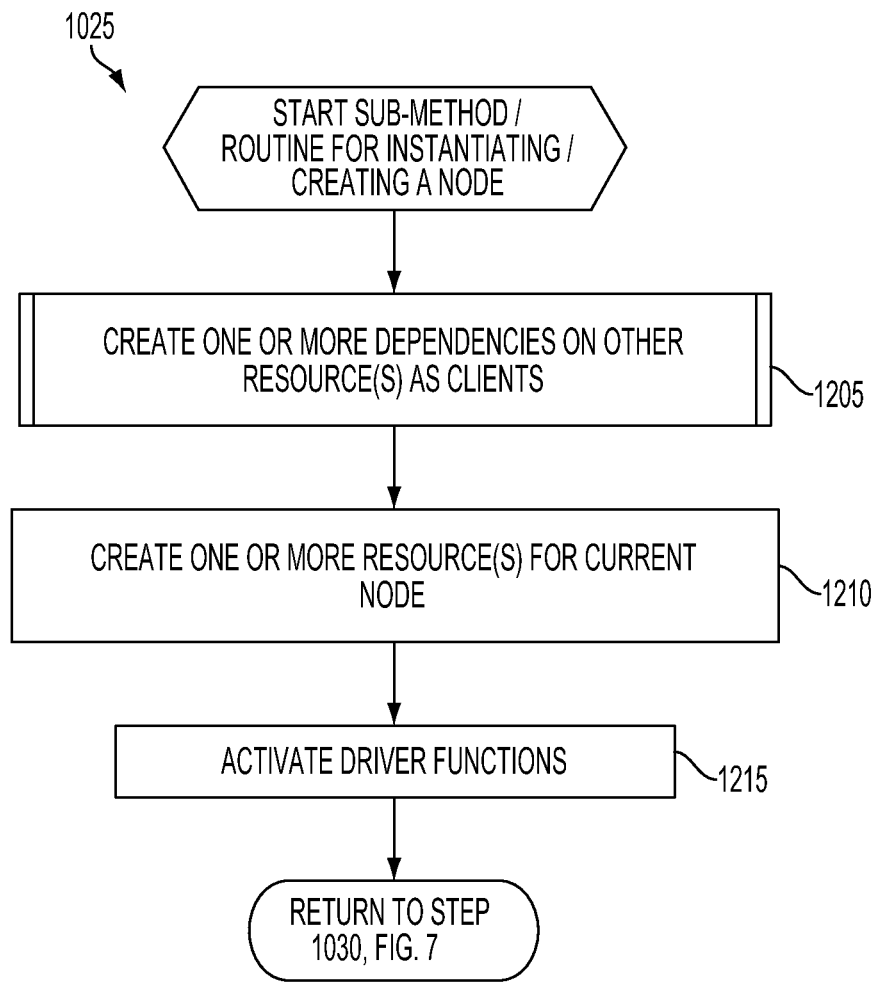
FIG. 10 is a flowchart illustrating a sub-method or a routine of FIGS. 7-8 for creating a node in a software architecture for a PCD.

FIG. 10 is a flowchart illustrating a sub-method or a routine 1025 of FIG. 7 for creating a node in a software architecture for a PCD 100. Routine block 1205 is the first routine in the sub-method or routine 1025 for instantiating or creating a node 601 according to one exemplary embodiment. In routine block 1205, one or more clients 648 that are associated with the node 601 being instantiated are created in this step. Further details about routine block 1205 will be described in further detail below in connection with FIG. 11.

In block 1210, the framework manager may create or instantiate the one or more resources corresponding to the node structure data of block 705. Next, in block 1215, the framework manager 440 may activate the driver functions received in routine block 1110 of routine block 1005. According to one exemplary aspect, the driver functions may be activated using the maximum values received in the resource array data block 1130 of routine block 1005. According to another, preferred, exemplary aspect, each driver function may be activated with an optional, initial value that is passed along with the node structure data from routine 1005. If initial data is not provided, the driver function is initialized at 0—the minimum value. The driver function is also usually activated in manner such that it is known that it is being initialized. This enables the resource to perform any operations that are specific to initialization, but do not need to be performed during normal or routine operation. The process then returns to step 1030 of FIG. 7.

Figure 11:
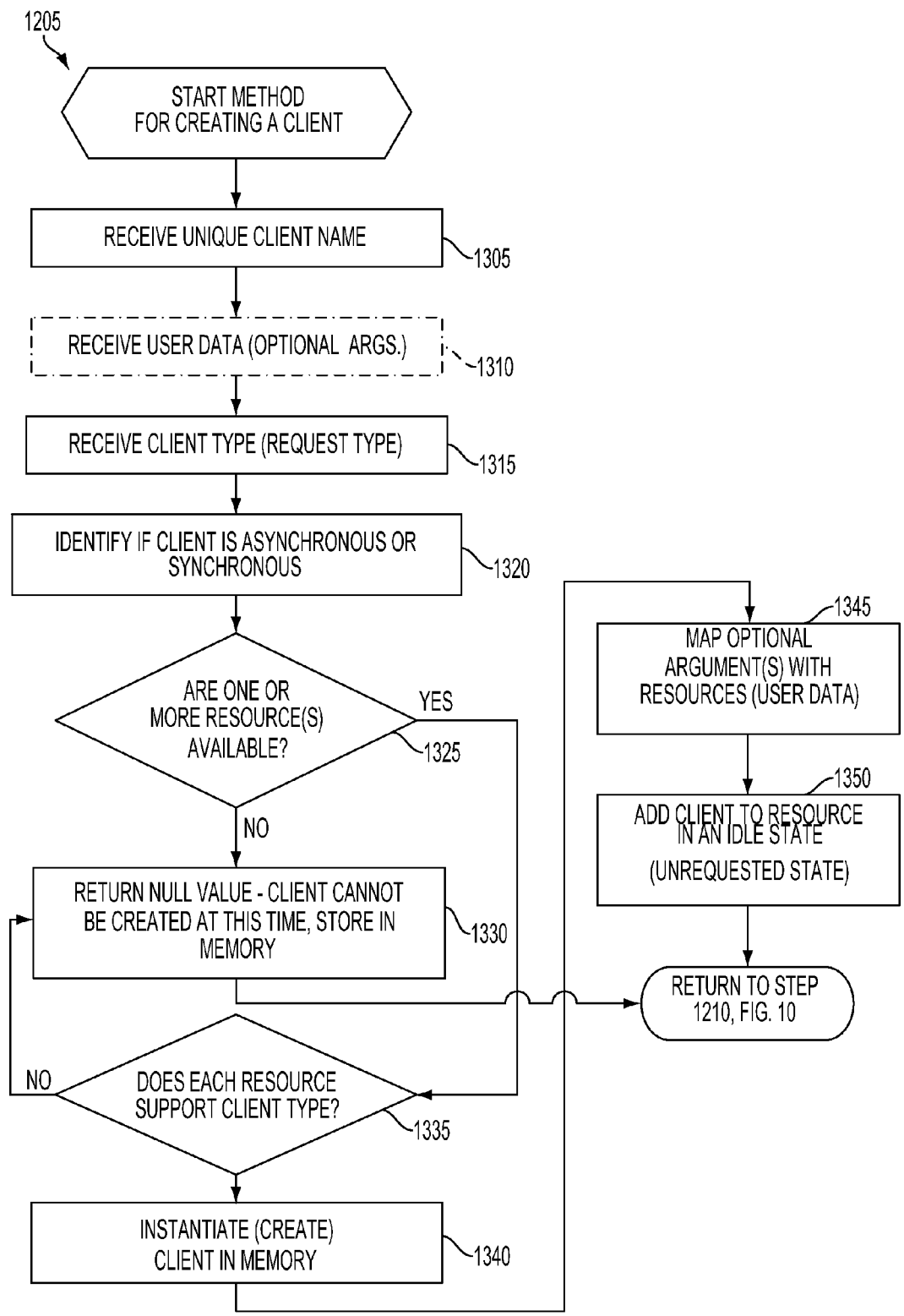
FIG. 11 is a flowchart illustrating a sub-method or a routine of FIG. 10 for creating a client in a software architecture of a PCD.

FIG. 11 is a flowchart illustrating a sub-method or a routine 1205 of FIG. 10 for creating or instantiating a client 648 in a software architecture of a PCD 100. Block 1305 is the first step of routine block 1205 in which a client 648 of one or more resources 601 is created. In block 1205, the framework manager 440 receives a name assigned to the client 648 being created. Similar to resource names, the name for a client 648 may comprise any type of alphanumeric and/or symbols.

Next, in block 1310, customized user data may be received by the framework manager 440 if there are any particular customizations for this client 648 being created. Block 1310 has been illustrated with dashed lines to indicate that the step is optional. The customized user data of block 1310 is similar to the customized user data discussed above in connection with the creation of resources for nodes 601.

In block 1315, the framework manager 440 receives the client type category assigned to the particular client being created. The client type category as of this writing may comprise one of four types: (a) required, (b) impulse, (c) vector, and (d) isochronous. The client type category list may be expanded depending upon the resources being managed by the system 101 and upon the application programs relying upon the resources of the nodes 601.

The required category generally corresponds with the processing of a scalar value that is passed from the required client 648 to a particular resource 601. For example, a required request may comprise a certain number of millions of instructions per second (MIPs). Meanwhile, the impulse category generally corresponds with the processing of a request to complete some activity within a certain period of time without any designation of a start time or stop time.

An isochronous category generally corresponds with a request for an action that is typically reoccurring and has a well-defined start time and a well-defined end time. A vector category generally corresponds with an array of data that usually is part of multiple actions that are required in series or in parallel.

Subsequently, in block 1320, the framework manager 440 receives data that indicates whether the client 648 has been designated as synchronous or asynchronous. A synchronous client 648 is one that typically requires the framework manager 440 to lock a resource of a node 601 until the resource 601 returns data and an indication that the resource 601 has finished completing the requested task from the synchronous client 648.

On the other hand, an asynchronous client 648 may be handled by one or more threads in parallel which are accessed by the framework manager 440. The framework 440 may create a callback to a thread and may return a value when the callback has been executed by a respective thread. One of ordinary skill the art recognizes that the asynchronous client 648 does not lock up a resource like a synchronous client 648 does when the task of the synchronous client 648 is being executed.

After block 1320, in decision block 1325, the framework manager 440 determines if the resource identified by the client 645 are available. If the inquiry to decision block 1325 is negative, then the "No" branch is followed to block 1330 in which a null value or message is returned to a user indicating that the client 648 cannot be created at this time.

If the inquiry to decision block 1325 is positive, then the "Yes" branch is followed to decision block 1335 in which the framework manager 440 determines if each resource identified by the client 648 supports the client type provided in block 1310. If the inquiry to decision block 1335 is negative, then the "No" branch is followed back to block 1330 in which a null value or message is returned indicating that the client 648 cannot be created at this time.

If the inquiry to decision block 1335 is positive, then the "Yes" branch is followed to block 1340 in which the framework manager 440 creates or instantiates the client 648 in memory. Next, in block 1345, if any customized user data is received in block 1310, such as optional arguments, then these optional arguments may be mapped with their respective resources to a particular node 601. Next, in block 1350, the newly created client 645 is coupled to its corresponding one or more resources in an idle state or on requested state as described above. The process then returns to block 1210 of FIG. 10.

Figure 12:
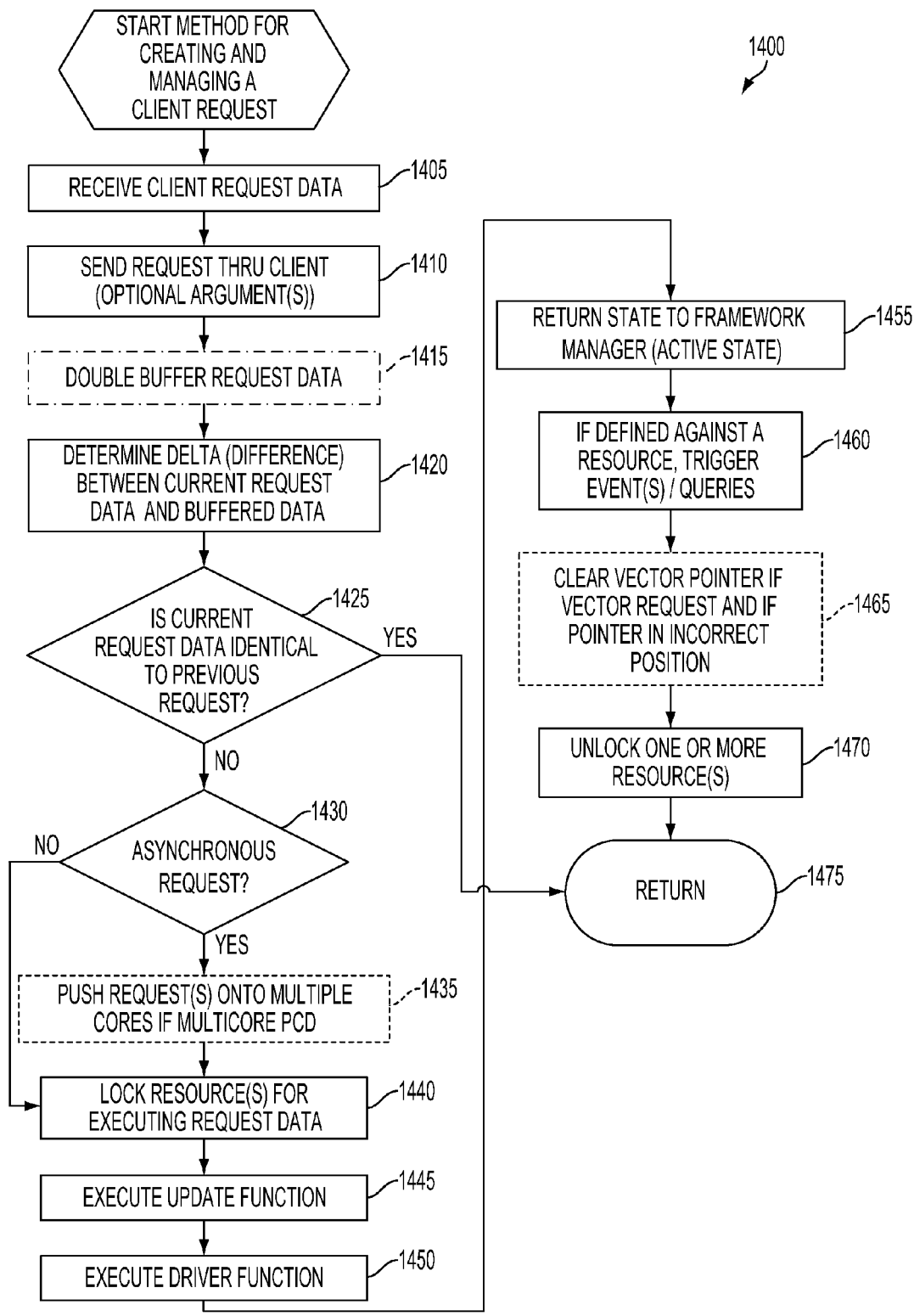
FIG. 12 is a flowchart illustrating a method for creating a client request against a resource in a software architecture for a PCD.

FIG. 12 is a flow chart illustrating a method 1400 for creating a client request 675 against a resource 601 in a software architecture for a PCD 100. The method 1400 is generally executed after client and node creation (instantiation) as described above in connection with FIGS. 7-11.

Block 1405 is the first step in the method 1400 for creating a client request 675 against the resource 601. This method 1400 will describe how the following three types of client requests 675 are handled by the framework manager 440: (a) required, (b) impulse, and (c) vector. As the names of the requests 675 mentioned above suggest, client requests 675 generally correspond with client types that were created and described above.

In block 1405, the framework manager 440 may receive the data associated with a particular client request 675 such as one of the three mentioned above: (a) required, (b) impulse, and (c) vector. The data associated with a required request generally comprises a scalar value that is passed from the required client 648 to a particular resource 601. For example, a required request may comprise a certain number of millions of instructions per second (MIPs). An impulse request comprises a request to complete some activity within a certain period of time without any designation of a start time or stop time. Data for a vector request generally comprises an array of multiple actions that are required to be completed in series or in parallel. A vector request may comprise an arbitrary length of values. A vector request usually has a size value and an array of values. Each resource of a node 601 may be extended to have a pointer field in order to support a vector request. In the "C" programming language, the pointer field is supported by the union function as understood by one of ordinary skill in the art.

Next, in block 1410, the framework manager 440 issues the request through the client 648 that was created by the method described above in connection with FIG. 11. Subsequently, in block 1415, the framework manager 440 double buffers the request data being passed through the client if the request is a required type or a vector type. If the request is an impulse type, then block 1415 is skipped by the framework manager 440.

For required requests, in this block 1415, values from a prior request are maintained in memory so that the framework manager 440 may determine if there is any difference between the previous requested values in the current set of requested values. For vector requests, prior requests are usually not maintained in memory, although a resource of a node 601 may maintain it as desired for a particular implementation. Therefore, block 1415 is optional for vector types of requests.

In block 1420, the framework manager 440 calculates the delta or difference between the previous set of requested values in the current set of requested values. In decision block 1425, the framework manager determines if the current set of requested values is identical to the previous set of requested values. In other words, the framework manager 440 determines if a difference exists between the current set of requested values and the previous set of requested values. If there is no difference between the current set and previous set of requested values, then the "Yes" branch is followed (which skips blocks 1430 through block 1470) to block 1475 in which the process ends.

If the inquiry to decision block 1425 is negative, meaning that the set of requested values are different relative to the set of pre-previous requested values, then the "No" branch is followed to decision block 1430.

In decision block 1430, the framework manager 440 determines if the current request is an asynchronous request. If the inquiry to decision block 1430 is negative, then the "No" branch is followed to block 1440 in which the resource 601 corresponding to the client request 675 is locked by the framework manager 440. If the inquiry to decision block 1430 is positive, meaning that the current request is asynchronous request type, then the "Yes" branch is followed to block 1435 in which the request may be pushed onto another thread and may be executed by another core if a multi-core system, like that of FIG. 1, is currently managed by the framework manager 440. Block 1435 has been illustrated with dashed lines to indicate that this step may be optional if the PCD 100 is a single core central processing system.

Subsequently, in block 1440, the resources 601 corresponding to the request 675 is locked by the framework manager 440. Next, in block 1445, the resource 601 executes the update function which generally corresponds to the plug-in data of the resource array data received in block 1130 of FIG. 9. The update function generally comprises a function responsible for the new resource state in light of a new client request. The update function compares its previous state with the requested state in the client request. If the requested state is greater than the previous state, then the update function will perform the client request. However, if the requested state is equal to or less than the current state and which the resource is operating at, then the client request will not be performed in order to increase the efficiency since the old state achieves or satisfies the requested state. An update function takes a new request from the client and aggregates it with all the other active requests to determine the new state for the resource.

As an example, multiple clients may be requesting a bus clock frequency. The update function for the bus clock would usually take the maximum of all the client requests and use that as the new desired state for the bus clock. It is not the case that all resources will use the same update function, although there are some update functions that will be used by multiple resources. Some common update functions are to take the maximum of client requests, to take the minimum of client requests and to sum the client request. Or resources may define their own custom update function if their resource needs to aggregate requests in some unique way.

Next, in block 1450, the framework manager 440 passes the data to the resource corresponding to the client 648 so that the resource may execute the driver function which is specific to the resource of a node 601. A driver function applies the resource state as computed by the update function. This may entail updating hardware settings, issuing requests to dependent resources, calling legacy functions or some combination of the above.

In the previous example, the update function computed the requested bus clock frequency. The driver function may receive that requested frequency and it may update the clock frequency control HW to run at that frequency. Note that sometimes it is not possible for the driver function to meet the exact requested state that update function has computed. In this case, the driver function may choose the frequency that best meets the request. For example, the bus clock HW may only be able to run at 128 MHz and 160 MHz, but the requested state might be 150 MHz. In this case, the driver function should run at 160 MHz, as that exceeds the requested state.

Next, in block 1455, the framework 440 receives state control from the resource which has executed the driver function in block 1450. Subsequently, in block 1460, if defined against the resource, events 690 may be triggered so that data is passed back to the client 648 which corresponds to the event 690. Events may be processed in another thread. This may minimize the amount of time spent with the resources locked and allows for parallel operation in a multi-core system as illustrated in FIG. 1. One or more events 690 may be defined against a resource in a manner similar to how a request may be defined against a resource as described in this method 1400. In other words, the event creation process may largely parallel the client creation process. One thing that is different with the events is that it is possible to define events that only get triggered when certain thresholds are crossed.

This defining of events that only get triggered based on thresholds allows for notification of when a resource is getting oversubscribed (it has more concurrent users than it can support) which is indicative of a system overloading condition, or when a resource goes low/off, which may allow other things to be shut off, restore functionality that was disabled when the system became oversubscribed, etc. Because the event registration may be done with thresholds, it reduces the amount of work the system has to do on event notification to only happen when there is something really necessary. It is also possible to register for an event on every state change.

Next, in optional block 1465, if the request being processed is a vector request, then this optional block 1465 is usually performed. Optional block 1465 generally comprises a check or determination to assess whether the vector pointer is still positioned on the same data that the user passed into the vector. If the inquiry to this optional block 1465 is positive, meaning that the pointer is still pointing to the same data which was passed by the user into the vector, then the pointer is cleared out so that references to old data is not maintained. This optional block 1465 is generally performed to account for the double buffering block 1415 described above when a vector request is being processed, compared to an impulse request and a required request.

Subsequently, in block 1470, the framework 440 unlocks the requested resource so that other client requests 648 may be handled by the current but now released requested resource of a particular node 601. The process then returns to the first block 1405 for receiving the next client request.

The above-described methods and data structures are essentially as applicable to a multi-processor PCD 100 as they are to a single-processor PCD 100. However, the remoting framework 300 (FIG. 3) may provide additional features that may enhance operation in a multi-processor embodiment. For example, the remoting framework 300 may advantageously render the details of inter-processor communication transparent to an application programmer or similar person. Thus, an application program, for example, may define a client that issues a request on a target resource without having to include in the client definition any identification of the processor domain that controls that resource. Rather, the remoting framework 300 ensures that the request will reach the target resource regardless of which processor controls the client and which processor controls the target resource. In addition, the remoting framework 300 manages the inter-processor communication so that, for example, an application program need not include any instructions relating to the protocol or other aspects of the communication paths (e.g., buses) between processors. Furthermore, as different inter-processor communication paths may use different protocols, the remoting framework 300 allows the resource definition to specify a protocol along with other aspects of the resource. These and other features relating to distributed resource management are described below with regard to FIGS. 13-17.

Figure 13:
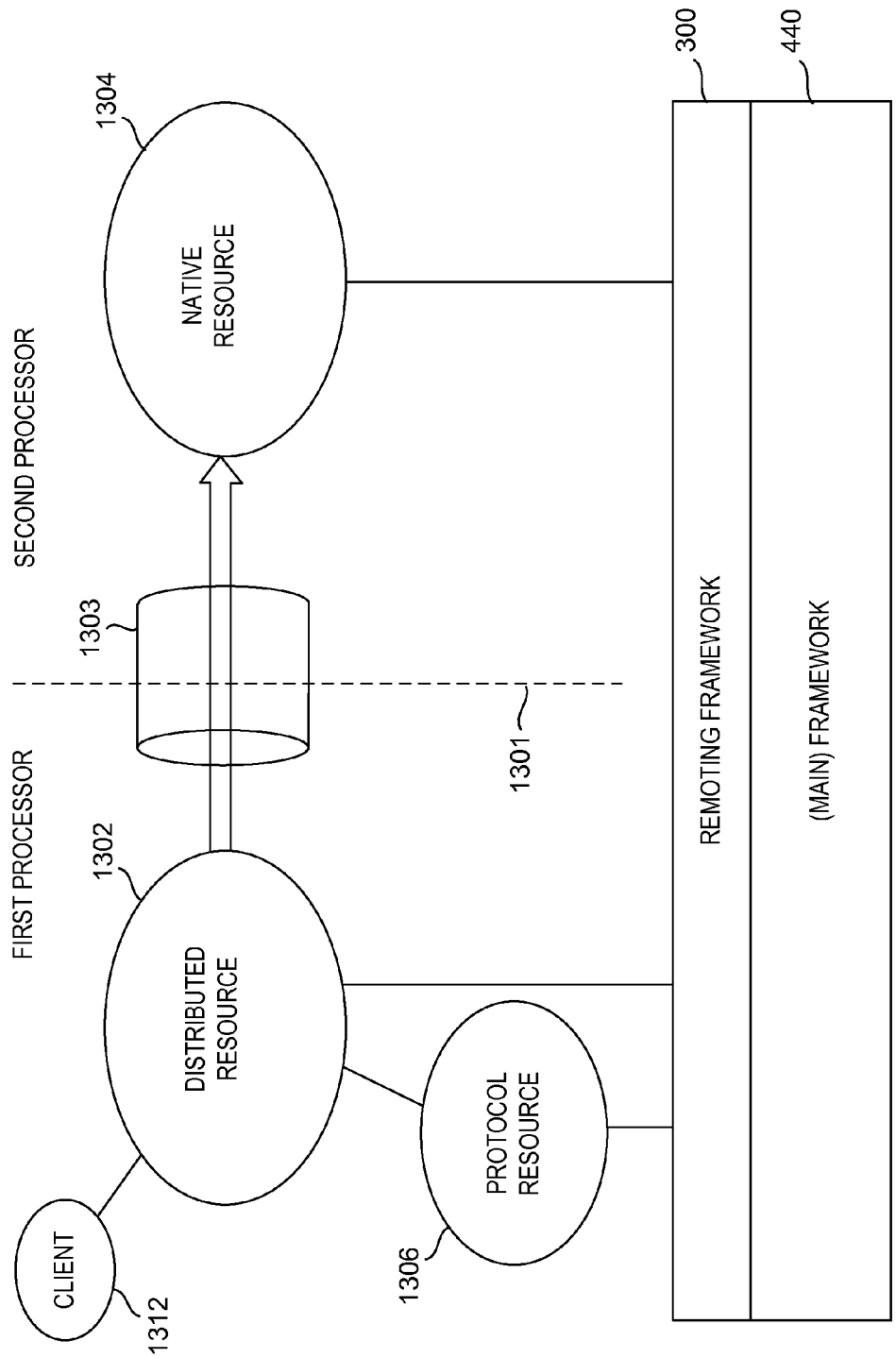
FIG. 13 illustrates a communication path between two processors, each controlling resources of its own resource graph.

FIG. 13 illustrates an example or instance in which a first resource 1302, which is controlled by a first processor (not shown) serves as a distributed or remote resource corresponding to a second resource 1304, which is controlled by a second processor (not shown). The term "distributed resource" or "remote resource" is used in this disclosure to refer to a resource on one processor that corresponds to a "native" resource on another processor. The second resource 1304 in this example serves as a native resource to the second processor. A distributed resource is used as a means to access the corresponding native resource. In this example the term "resource" may be used interchangeably with the term "node," as it should be understood that a resource may be included in a node.

A broken line 1301 illustrates a division between resources controlled by the first processor (to the left of the line 1301) and resources controlled by the second processor (to the right of the line 1301). The first resource 1302 is one of two or more resources that are controlled by the first processor. One such resource may be a protocol resource 1306 on which the first resource 1302 depends. Likewise, the second resource 1304 is one of two or more resources that are controlled by the second processor. In some embodiments, only a distributed resource and not a native resource depends on a protocol resource. Therefore, in such embodiments only the first (distributed) resource 1302 depends on a protocol resource 1306. However, in other embodiments any resource may depend on a protocol resource. Thus, in an alternative embodiment the second resource 1304 could also depend on a protocol resource (not shown). The first and second resources 1302 and 1306 may also depend on additional resources in the same manner as described above with regard to resources or nodes in general, but such additional resources are not shown in FIG. 13 for purposes of clarity. Note that the resources controlled by the first processor are defined by a first resource graph (i.e., a directed acyclic graph), and the resources controlled by the second processor are defined by a second such resource graph that does not share any resources with the first resource graph.

The first and second resources 1302 and 1304, under control of their respective processors, are capable of communicating information via a communication path 1303. The communication path 1303 represents the combination of the physical medium between the first and second processors and the one or more layers of transport protocols used to communicate via that medium. Accordingly, any communications between the first resource 1302 and the second resource 1304 must conform to the protocols. Protocol resource 1306 defines a protocol or may point to a protocol definition in a library (not shown). The remoting framework 300 and (main) framework 440 operate in conjunction with one another to manage the resources and communications between them. As described below, a client 1312, under control of the first processor, may issue one or more resource requests on the first resource 1302. The first resource 1302 uses the functionality of the corresponding second resource 1304 to service the resource request.

Figure 14:
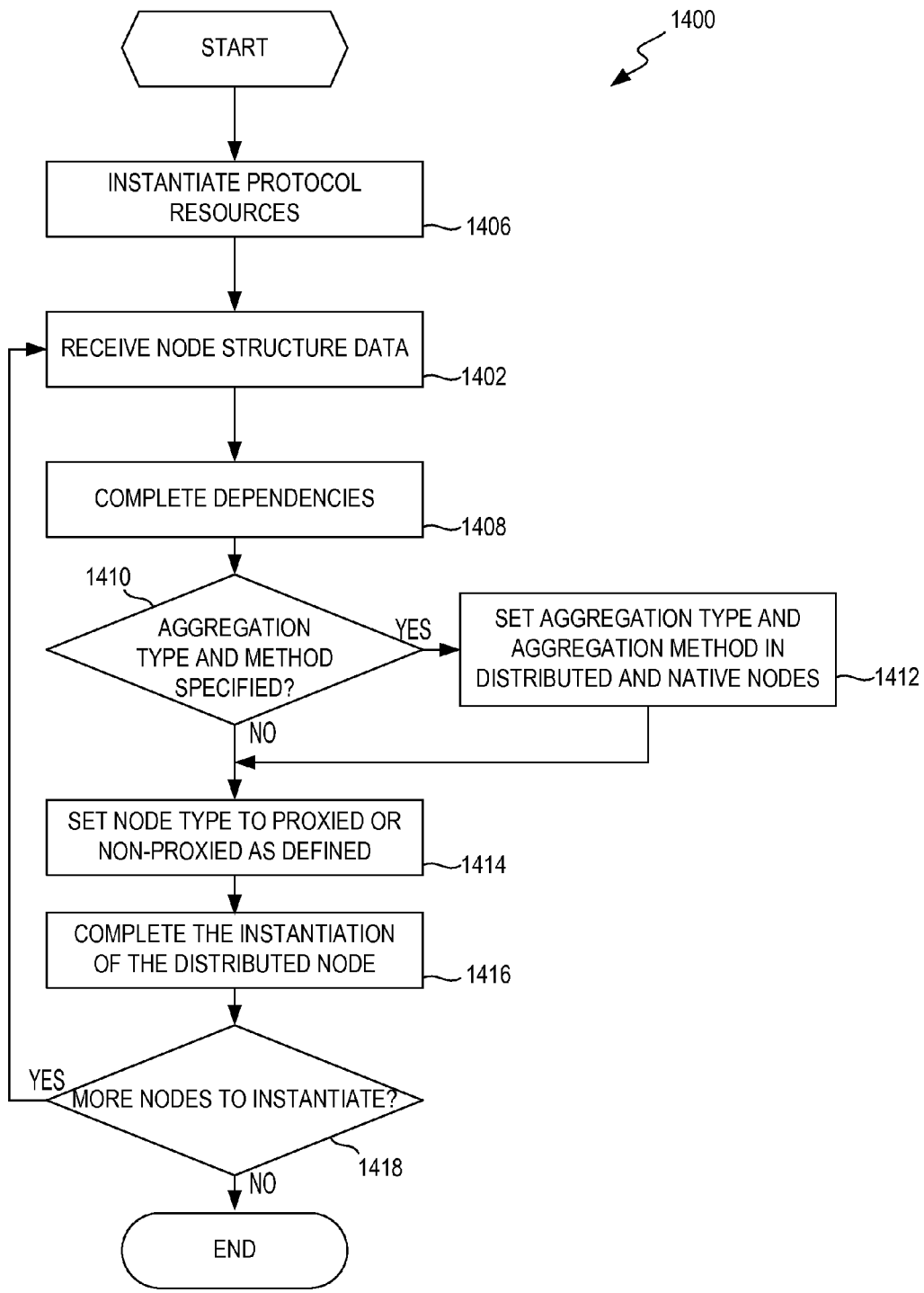
FIG. 14 is another flowchart illustrating a method for creating a node architecture for managing resources of a PCD, where some of the resources are distributed resources.

FIG. 14 is a flowchart illustrating a method 1400 for creating or instantiating a distributed resource, such as the first resource 1302 of FIG. 13. The flowchart of FIG. 14 is intended to illustrate features that are in addition to or that augment the features described above with regard to methods for instantiating resources, such as the method illustrated in FIGS. 7-10. Accordingly, except where it may be indicated otherwise, any or all of the blocks in FIGS. 7-10 may be included but are not shown in FIG. 14 for purposes of clarity.

As indicated by block 1402, the framework managers 300 and 440 receive node structure data that defines a node, such as that containing the first resource 1302. In the exemplary embodiment dependencies are handled in essentially the same way as described above with regard to FIGS. 7-10, except that, as indicated by block 1406, protocol resources may be instantiated at any time. A resource that depends on a protocol resource does not need to wait until its protocol resource is instantiated. Instantiation of dependencies in the manner described above with regard to FIGS. 7-10 is illustrated generally by block 1408.

Although instantiation generally follows the methods described above with regard to FIGS. 7-10, it should be noted that a distributed resource cannot be instantiated until the native resource to which it corresponds has been instantiated. Thus, instantiation of a native resource may delay instantiation of the distributed resource in the same manner as instantiation of dependent resources may delay instantiation of a resource that depends on them. Also note that messages relating to the state of instantiation of the native resource that are communicated between the first and second processors via the communication path 1310 and the framework managers 300 and 440 generally conform to the specified protocol. For example, after the protocol resource 1306 on the first processor is instantiated, the first process, operating in accordance with the remoting framework manager 300, may send a request for notification, encoded or otherwise conforming to the protocol, to the second processor. When the second resource 1304 has been instantiated, the second processor, operating in accordance with the remoting framework manager 300, may respond to the request for notification by sending a response to the first processor indicating that the second resource 1304 has been instantiated. The remoting framework manager 300 may manage such communications and others as part of the process of instantiating the software architecture.

The protocol resource 1306 on the first processor may include, among other functions, a function to create a client, such as the client 1312 shown in FIG. 13, and return a handle to the client that may be used by a thread of execution. A thread of execution (e.g., part of the execution of an application program or other software element) may invoke the function to create such a client 1312. The thread may use the client 1312 to issue resource requests and otherwise use the client 1312 in the same manner as described above with regard to clients in general. The resource request is protocol-specific and allows the thread to access the second resource 1304 without the thread having to provide any information relating to the protocol. From the perspective of the thread and its clients, the protocol may be irrelevant or transparent.

As indicated by block 1410, the frameworks 300 and 440 determine if an aggregation method is specified in the received node structure data. If it is determined that an aggregation method is specified, the aggregation method is set in the distributed and native resources (nodes), as indicated by block 1412. There are two aggregation types: local and proxy. In defining a resource, one of the two aggregation types may be selected. Accordingly, in instantiating a resource (node), the resource is set to perform either local aggregation or remote aggregation.

A resource performs local aggregation by applying an algorithm to multiple resource requests that it may receive "concurrently." In this context, two (or more) requests are "concurrent" for the time during which they both remain active. For example, a first processor may issue a resource request to set its speed to 50 MIPS, and before the first processor's request has been completed or otherwise terminated a second processor may issue a resource request to set its speed to 100 MIPS. Aggregation may be performed in accordance with a method such as adding the argument of each of the multiple concurrent resource requests, by determining the maximum argument from among those of all the multiple resource requests, by determining the minimum argument from among those of all the multiple resource requests, or by any other suitable method. The aggregation method may be specified or defined along with the aggregation type in the node structure data that defines the resource (node).

The node structure data may indicate that the node is to be instantiated as a proxied node or a non-proxied node. The manner in which this feature may be used is described below with regard to FIGS. 16-17. As indicated by block 1414, the node type is set to the indicated type. In the case of a non-proxied node, client requests are aggregated locally in a manner determined by the node structure, and a driver function is used that sends the locally aggregated request to the native resource. Queries and events are handled by the distributed resource. In the case of a proxied node, client requests are not aggregated but instead are sent individually to the native resources. Additionally, all queries and events are forwarded to the native resource.

As indicated by block 1416, any remaining steps in the instantiation process occur. Such aspects of instantiating the distributed node may be essentially the same as described above with regard to FIGS. 7-10. As indicated by block 1418, if additional nodes are defined, the method repeats or continues for those nodes.

Figure 15:
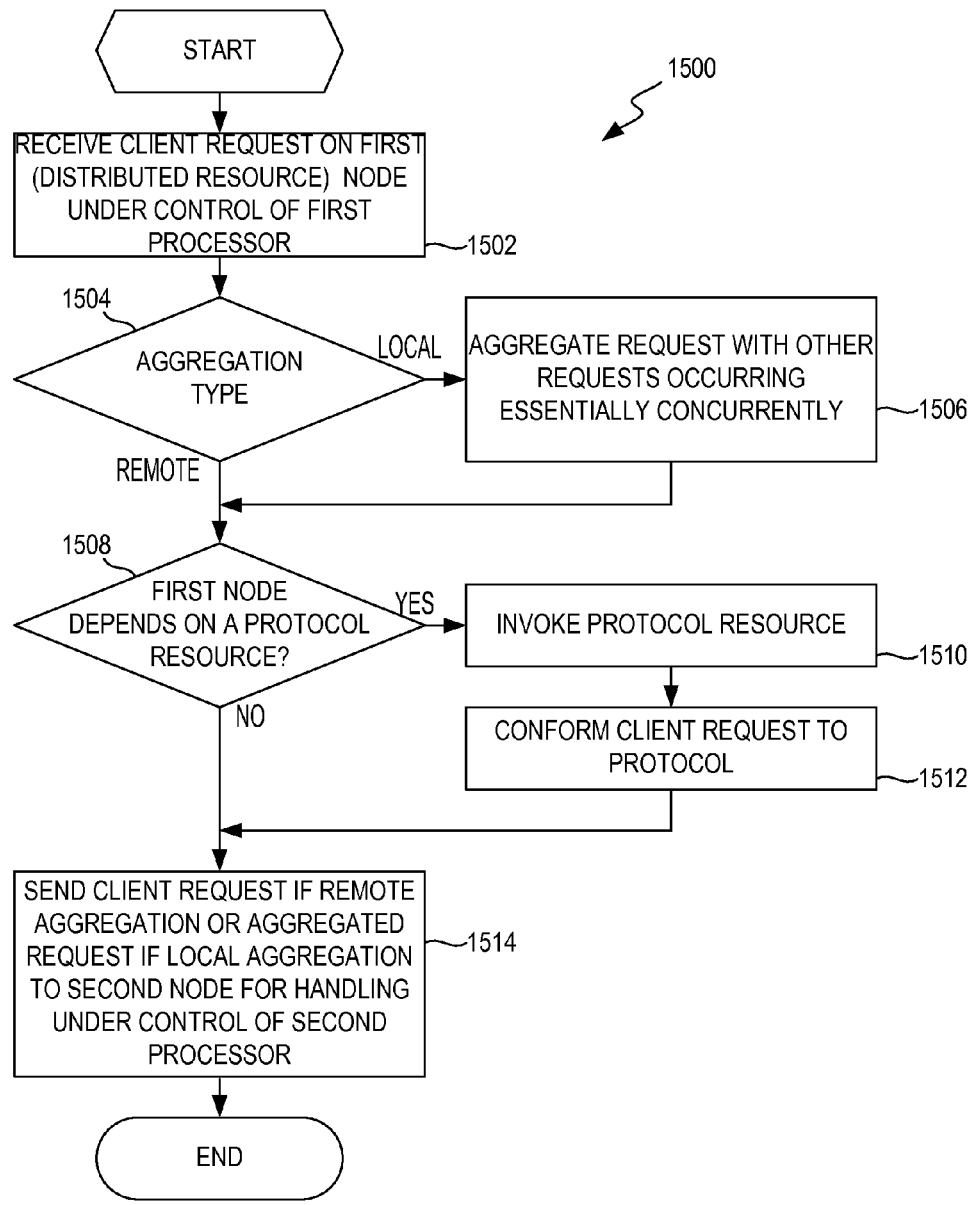
FIG. 15 is another flowchart illustrating a method for creating a client request against a distributed resource in a software architecture for a PCD.

FIG. 15 is a flowchart illustrating a method 1500 for servicing a client request. The flowchart of FIG. 15 is intended to illustrate features that are in addition to or that augment the features described above with regard to methods for servicing client requests, such as the method illustrated in FIG. 12. Accordingly, except where it may be indicated otherwise, any or all of the blocks in FIG. 12 may be included but are not shown in FIG. 15 for purposes of clarity.

As indicated by block 1502, the distributed resource, such as that of the first node 1302 in FIG. 13, receives a client request. As indicated by block 1504, it is determined whether the aggregation type associated with the requested resource is local or remote. If the aggregation type is local, then the requested resource aggregates the request argument with others occurring within the same window, as indicated by block 1506. As described above, aggregation relates to handling concurrent resource requests. If the aggregation type associated with the requested resource is remote, then it will be left up to the corresponding native resource, such as the second resource 1304 in FIG. 13, to aggregate the request with others.

Whether local or remote, aggregation implicates three sequential states of a client request: (1) Request Issued, (2) Request in Progress and (3) Request Applied. In an instance in which client requests are issued concurrently, i.e., two client requests each begin the Request Issued state at effectively the same time or within the above-referenced window of each other, the client request that occurred first causes the requested resource to be locked, and the client request that occurred second is handled after the client request that occurred first. A client request is handled or serviced during the Request In Progress state. After the client request has been completed, the client request is assigned the Request Applied state. Aggregation comes into play in an instance in which multiple concurrent client requests have reached the Request Applied state. For example, if a resource has been defined as using the above-referenced maximum aggregation method, and client "A" requests 50 MIPS while, perhaps a few microseconds later, client "B" requests 100 MIPS, these initial requests will be serialized. Accordingly, when the first client request is processed, the resource will be set to the argument of the first client request or 50 MIPS. Then, when the second client request is processed, the resource, in accordance with the maximum aggregation method, will be set to 100 because 100 is the maximum of 50 and 100. Thereafter, when both of these initial client requests are in the Request Applied state, client "B" may issue another client request for 25 MIPS. The requested resource, in accordance with the maximum aggregation method, will be set to 50 because 50 is the maximum of 50 and 25.

As indicated by block 1508, it is determined whether the requested resource depends on a protocol resource, such as the protocol resource 1306 in FIG. 13. If the requested resource depends on a protocol resource, then the protocol resource is invoked and used to conform the resource request to the protocol that the protocol resource defines, as indicated by block 1510 and 1512, respectively. As indicated by block 1514, in conformance with the protocol, a resource request reflecting the aggregation result (result of block 1506) is sent or, if the remote resource is to perform the aggregation, the resource request is forwarded, to the native resource, such as the second resource 1304 in FIG. 13. The driver function (not shown) of the distributed resource invokes the protocol.

Although not shown in FIG. 15, events involving distributed resources may be handled in essentially the same manner as described above with regard to FIG. 12. Events of a type that monitor for a value crossing a threshold may be especially useful in combination with a proxied resource, as described below.

Figure 16:
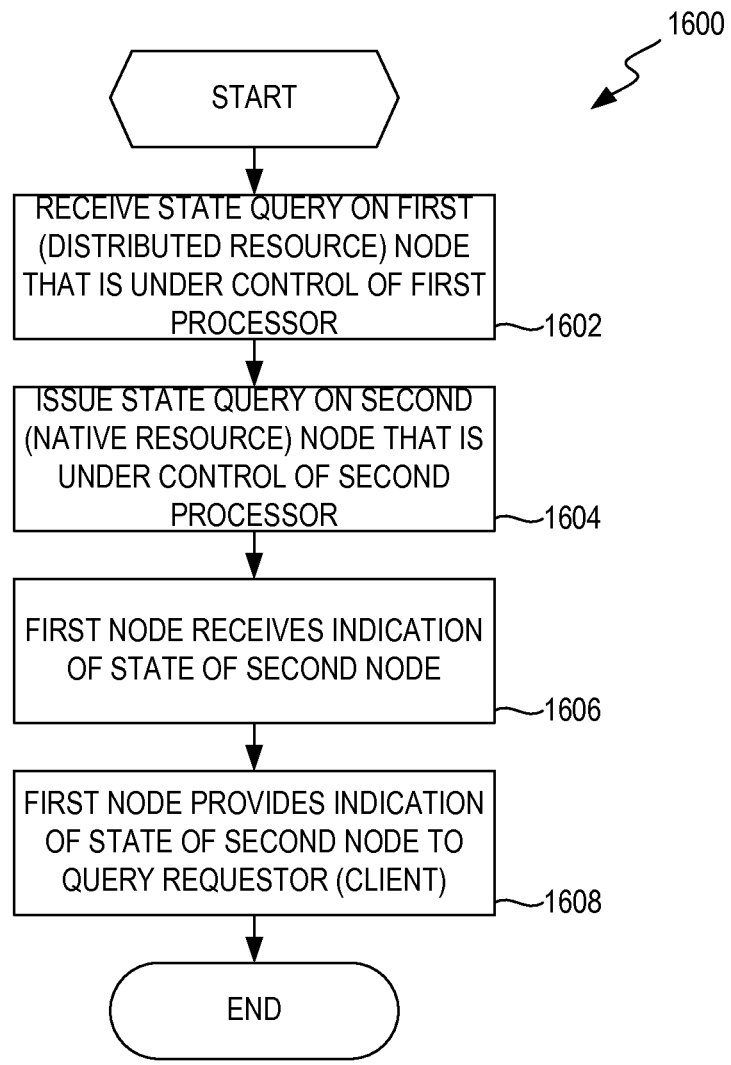
FIG. 16 is a flowchart illustrating a method for handling a state query against a non-proxied distributed resource in a software architecture for a PCD.

FIG. 16 is a flowchart illustrating a method 1600 for servicing a state query on a distributed resource of the non-proxied type. State queries are managed by the framework 440 as described above with regard to FIGS. 5-6. The flowcharts of FIGS. 16-17 are intended to illustrate features that are in addition to or that augment the features described above with regard to FIGS. 5-6. Accordingly, except where it may be indicated otherwise, any or all of the features described above with regard to FIGS. 5-6 may be included but are not shown in FIGS. 16-17 for purposes of clarity.

As indicated by block 1602, the distributed resource, such as that of the first node 1302 in FIG. 13, receives a state query. In this example, the first node 1302 represents a non-proxied node or resource. As indicated by block 1604, the state query is forwarded to the corresponding native resource such as the second resource 1304 in FIG. 13. As indicated by block 1606, the state of the native resource is sent back to the distributed resource in response to the state query. As indicated by block 1608, the distributed resource may then provide a state indication, which represents the state of the native resource, to the query requestor (client).

Figure 17A:
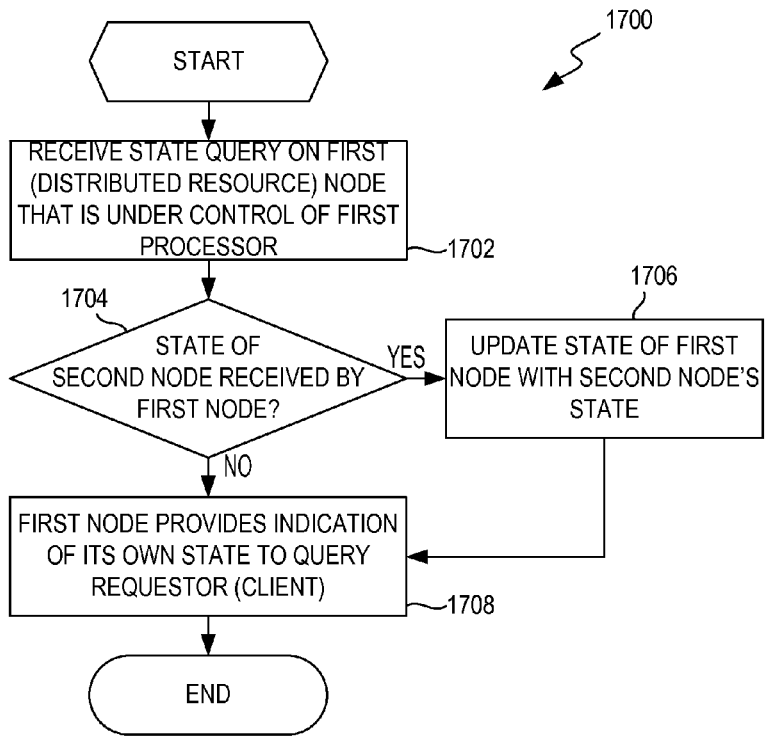
FIG. 17A is a flowchart illustrating a first portion of a method for handling a state query against a non-proxied distributed resource in a software architecture for a PCD.

FIG. 17A is a flowchart illustrating a first portion of a method 1700 for servicing a state query on a distributed resource of the proxied type. As indicated by block 1702, the distributed resource, such as that of the first node 1302 in FIG. 13, receives a state query. In this example, the first node 1302 represents a proxied node or resource. As indicated by blocks 1704 and 1706, respectively, each time the distributed resource receives an indication of the native resource's state, the distributed resource updates its state to reflect the native resource's state. As indicated by block 1608, the distributed resource provides an indication of its own state to the query requestor (client). Thus, in the case of a proxied distributed resource, its state only changes when it receives an notification of a change in state from the corresponding native resource.

As indicated by block the state query is forwarded to the corresponding native resource such as the second resource 1304 in FIG. 13. As indicated by block 1606, the state of the native resource is sent back to the distributed resource in response to the state query.

Figure 17B:
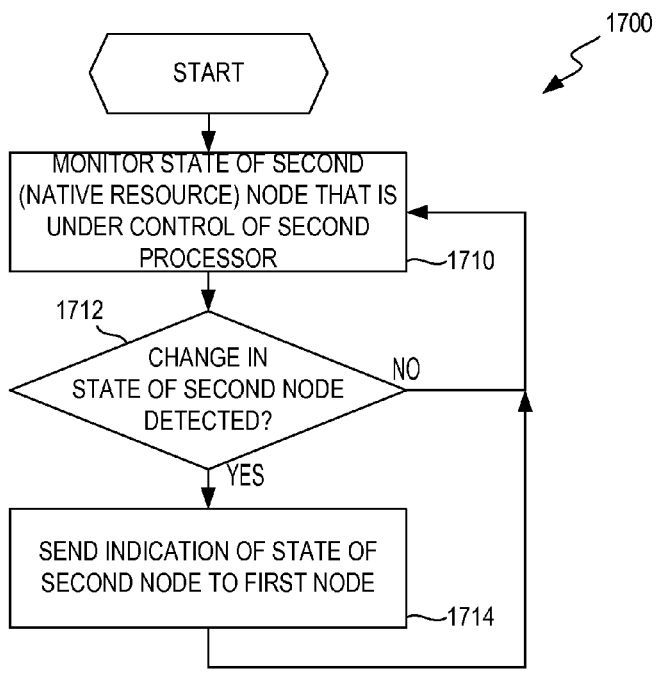
FIG. 17B is a flowchart illustrating a second portion of a method for handling a state query against a non-proxied distributed resource in a software architecture for a PCD.

FIG. 17B is a flowchart illustrating a second portion of the method 1700 for servicing a state query on a distributed resource of the proxied type. This second portion reflects the perspective of the native resource and operates asynchronously and in parallel with the first portion illustrated in FIG. 17A. As indicated by block 1710, the state of a native resource, such as the second node 1304 of FIG. 13, is monitored. As indicated by blocks 1712 and 1714, respectively, if a change in state of the native resource is detected, an indication of the state of the native resource is sent to the corresponding distributed resource.

The use of proxied distributed resources in appropriate instances may promote the desirable goal of minimizing inter-processor traffic, because state information is only sent from the native resource's processor to the distributed resource's processor when the native resource's state changes. In contrast, in the case of a non-proxied resource, a state query is sent and state information is returned each time the distributed resource receives a state query. Proxied resources may be used in instances in which, for example, it is the state of the distributed resource, rather than the corresponding native resource, that is most relevant to the task to be performed under control of the first processor.

As noted above with regard to FIGS. 5-6, events and queries are related aspects of the software architecture. Events of a type that monitor for a value crossing a threshold may be especially useful in combination with a proxied resource, because inter-processor messages are only sent when the when the native resource's state crosses a threshold rather than every time the native resource's state changes.

In view of the disclosure above, one of ordinary skill in the art is able to write computer code or identify appropriate hardware and/or other logic or circuitry to implement the distributed resource management system and method without difficulty based on the flowcharts and associated description in this specification, for example. Therefore, disclosure of a particular set of program code instructions or detailed hardware devices is not considered necessary for an adequate understanding of how to make and use the distributed resource management system and method. The inventive functionality of the claimed computer implemented processes is explained in more detail in the above description and in conjunction with the drawing figures, which may illustrate various process flows. Further, the processors 110, 126, 202, 206, etc., in combination with the memory 112 and the instructions stored therein may serve as a means for performing one or more of the method steps described herein.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage medium may be any available medium that may be accessed by a computer. By way of example, and not limitation, such computer-readable media may comprise RAM, ROM, EEPROM, CD-ROM or other optical disk storage, magnetic disk storage or other optical or magnetic storage devices, or any other medium that may be used to carry or store desired program code in the form of instructions or data structures and that may be accessed by a computer. The term "disk" or "disc," as used herein, includes but is not limited to compact disc ("CD"), laser disc, optical disc, digital versatile disc ("DVD"), floppy disk and Blu-ray disc. Combinations of the above should also be included within the scope of computer-readable media.

Although selected aspects have been illustrated and described in detail, it will be understood that various substitutions and alterations may be made therein without departing from the spirit and scope of the present disclosure, as defined by the following claims.

What is claimed is:

1. A method for distributed resource management in a portable computing device having a first plurality of resources controlled by a first processor and a second plurality of resources controlled by a second processor, the method comprising:
   instantiating a first node controlled by the first processor, the first node corresponding to a second node controlled by the second processor, the first plurality of resources defined by a first directed acyclic graph, the second plurality of resources defined by a second directed acyclic graph not sharing any resources with the first directed acyclic graph, wherein each node of the first directed acyclic graph represents an encapsulation of functionality of one or more resources controlled by the first processor, each edge of the first directed acyclic graph represents a client request, and adjacent nodes of the first directed acyclic graph represent resource dependencies, and wherein each node of the second directed acyclic graph represents an encapsulation of functionality of one or more resources controlled by the second processor, each edge of the second directed acyclic graph represents a client request, and adjacent nodes of the second directed acyclic graph represent resource dependencies;
   receiving a client request on the first node from a client under control of the first processor; and
   issuing a client request on the second node in response to the client request on the first node.

2. The method of claim 1, wherein the first node depends on a protocol resource, the first node is instantiated to include a driver that invokes a transport protocol defined by the protocol resource, and the driver conforms the client request on the second node to the transport protocol.

3. The method of claim 2, wherein the first node is not instantiated until the protocol resource is instantiated and the second node is instantiated.

4. The method of claim 1, further comprising: receiving a plurality of client requests on the first node; and the first node aggregating the received plurality of client requests to provide an aggregation result; wherein issuing a client request on the second node comprises issuing a client request for the aggregation result.

5. The method of claim 1, further comprising: receiving a plurality of client requests on the first node, wherein issuing a client request on the second node comprises issuing a plurality of client request on the second node corresponding to the plurality of client requests issued on the first node; and the second node aggregating the plurality of client requests issued on the second node to provide an aggregation result.

6. The method of claim 1, further comprising: receiving a first state query on the first node from a client under control of the first processor; issuing a second state query on the second node to obtain an indication of a state of the second node; and the first node providing the indication of the state of the second node in response to the first state query.

7. The method of claim 1, further comprising: receiving a first state query on the first node from a client under control of the first processor; the first node providing an indication of a state of the first node in response to the first state query; detecting a change in state of the second node; and providing an indication of the state of the second node to the first node in response to detection of a change in state of the second node.

8. A computer system for distributed resource management in a portable computing device having a first plurality of resources controlled by a first processor and a second plurality of resources controlled by a second processor, the computer system comprising:
   a processor which:
      instantiates a first node controlled by the first processor, the first node corresponding to a second node controlled by the second processor, the first plurality of resources defined by a first directed acyclic graph, the second plurality of resources defined by a second directed acyclic graph not sharing any resources with the first directed acyclic graph, wherein each node of the first directed acyclic graph represents an encapsulation of functionality of one or more resources controlled by the first processor, each edge of the first directed acyclic graph represents a client request, and adjacent nodes of the first directed acyclic graph represent resource dependencies, and wherein each node of the second directed acyclic graph represents an encapsulation of functionality of one or more resources controlled by the second processor, each edge of the second directed acyclic graph represents a client request, and adjacent nodes of the second directed acyclic graph represent resource dependencies;
      receives a client request on the first node from a client under control of the first processor; and
      issues a client request on the second node in response to the client request on the first node.

9. The computer system of claim 8, wherein the first node depends on a protocol resource, the first node is instantiated to include a driver that invokes a transport protocol defined by the protocol resource, and the driver conforms the client request on the second node to the transport protocol.

10. The computer system of claim 9, wherein the first node is not instantiated until the protocol resource is instantiated and the second node is instantiated.

11. The computer system of claim 8, wherein the processor receives a plurality of client requests on the first node; and the first node aggregating the received plurality of client requests to provide an aggregation result; wherein issuing a client request on the second node comprises issuing a client request for the aggregation result.

12. The computer system of claim 8, wherein the processor receives a plurality of client requests on the first node, wherein issuing a client request on the second node comprises issuing a plurality of client request on the second node corresponding to the plurality of client requests issued on the first node; and the second node aggregating the plurality of client requests issued on the second node to provide an aggregation result.

13. The computer system of claim 8, wherein the processor receives a first state query on the first node from a client under control of the first processor; and issues a second state query on the second node to obtain an indication of a state of the second node; and the first node providing the indication of the state of the second node in response to the first state query.

14. The computer system of claim 8, wherein the processor receives a first state query on the first node from a client under control of the first processor; the first node providing an indication of a state of the first node in response to the first state query; and detects a change in state of the second node; and provides an indication of the state of the second node to the first node in response to detection of a change in state of the second node.

15. A computer system for distributed resource management in a portable computing device having a first plurality of resources controlled by a first processor and a second plurality of resources controlled by a second processor, the computer system comprising:

means for instantiating a first node controlled by the first processor, the first node corresponding to a second node controlled by the second processor, the first plurality of resources defined by a first directed acyclic graph, the second plurality of resources defined by a second directed acyclic graph not sharing any resources with the first directed acyclic graph, wherein each node of the first directed acyclic graph represents an encapsulation of functionality of one or more resources controlled by the first processor, each edge of the first directed acyclic graph represents a client request, and adjacent nodes of the first directed acyclic graph represent resource dependencies, and wherein each node of the second directed acyclic graph represents an encapsulation of functionality of one or more resources controlled by the second processor, each edge of the second directed acyclic graph represents a client request, and adjacent nodes of the second directed acyclic graph represent resource dependencies;

means for receiving a client request on the first node from a client under control of the first processor; and means for issuing a client request on the second node in response to the client request on the first node.

16. The computer system of claim 15, wherein the first node depends on a protocol resource, the first node is instantiated to include a driver that invokes a transport protocol defined by the protocol resource, and the driver conforms the client request on the second node to the transport protocol.

17. The computer system of claim 16, wherein the first node is not instantiated until the protocol resource is instantiated and the second node is instantiated.

18. The computer system of claim 15, further comprising: means for receiving a plurality of client requests on the first node; and means for the first node aggregating the received plurality of client requests to provide an aggregation result; wherein issuing a client request on the second node comprises issuing a client request for the aggregation result.

19. The method of claim 15, further comprising: means for receiving a plurality of client requests on the first node, wherein issuing a client request on the second node comprises issuing a plurality of client request on the second node corresponding to the plurality of client requests issued on the first node; and means for the second node aggregating the plurality of client requests issued on the second node to provide an aggregation result.

20. The computer system of claim 15, further comprising: means for receiving a first state query on the first node from a client under control of the first processor; means for issuing a second state query on the second node to obtain an indication of a state of the second node; and means for the first node providing the indication of the state of the second node in response to the first state query.

21. The computer system of claim 15, further comprising: means for receiving a first state query on the first node from a client under control of the first processor; means for the first node providing an indication of a state of the first node in response to the first state query; means for detecting a change in state of the second node; and providing an indication of the state of the second node to the first node in response to detection of a change in state of the second node.

22. A computer program product comprising a non-transitory computer usable medium having a computer readable program code embodied therein, said computer readable program code being executed to implement a method for managing resources of a portable computing device, said method comprising:

instantiating a first node controlled by the first processor, the first node corresponding to a second node controlled by the second processor, the first plurality of resources defined by a first directed acyclic graph, the second plurality of resources defined by a second directed acyclic graph not sharing any resources with the first directed acyclic graph, wherein each node of the first directed acyclic graph represents an encapsulation of functionality of one or more resources controlled by the first processor, each edge of the first directed acyclic graph represents a client request, and adjacent nodes of the first directed acyclic graph represent resource dependencies, and wherein each node of the second directed acyclic graph represents an encapsulation of functionality of one or more resources controlled by the second processor, each edge of the second directed acyclic graph represents a client request, and adjacent nodes of the second directed acyclic graph represent resource dependencies;

receiving a client request on the first node from a client under control of the first processor; and issuing a client request on the second node in response to the client request on the first node.

23. The computer program product of claim 22, wherein the first node depends on a protocol resource, the first node is instantiated to include a driver that invokes a transport protocol defined by the protocol resource, and the driver conforms the client request on the second node to the transport protocol.

24. The computer program product of claim 23, wherein the first node is not instantiated until the protocol resource is instantiated and the second node is instantiated.

25. The computer program product of claim 22, wherein the method further comprises: receiving a plurality of client requests on the first node; and the first node aggregating the received plurality of client requests to provide an aggregation result; wherein issuing a client request on the second node comprises issuing a client request for the aggregation result.

26. The computer program product of claim 22, wherein the method further comprises: receiving a plurality of client requests on the first node, wherein issuing a client request on the second node comprises issuing a plurality of client request on the second node corresponding to the plurality of client requests issued on the first node; and the second node aggregating the plurality of client requests issued on the second node to provide an aggregation result.

27. The computer program product of claim 22, wherein the method further comprises: receiving a first state query on the first node from a client under control of the first processor; issuing a second state query on the second node to obtain an indication of a state of the second node; and the first node providing the indication of the state of the second node in response to the first state query.

28. The computer program product of claim 22, wherein the method further comprises: receiving a first state query on the first node from a client under control of the first processor; the first node providing an indication of a state of the first node in response to the first state query; detecting a change in state of the second node; and providing an indication of the state of the second node to the first node in response to detection of a change in state of the second node.

* * * * *